(12) United States Patent
Jafar Mazumder et al.

(10) Patent No.: US 9,868,894 B1
(45) Date of Patent: *Jan. 16, 2018

(54) CORROSION INHIBITION WITH ALKOXY AROMATIC IMIDAZOLINES

(71) Applicant: King Fahd University of Petroleum and Minerals, Dhahran (SA)

(72) Inventors: Mohammad Abu Jafar Mazumder, Hamilton (CA); Shaikh Asrof Ali, West Midnapore (IN); Hasan Ali Al-Muallem, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,762

(22) Filed: Sep. 6, 2017

Related U.S. Application Data

(63) Continuation of application No. 14/727,393, filed on Jun. 1, 2015, now Pat. No. 9,816,024.

(51) Int. Cl.
*C23F 11/14* (2006.01)
*C09K 8/54* (2006.01)

(52) U.S. Cl.
CPC .............. *C09K 8/54* (2013.01); *C23F 11/149* (2013.01); *C09K 2208/32* (2013.01)

(58) Field of Classification Search
CPC ...... C09K 8/54; C09K 2208/32; C23F 11/149
See application file for complete search history.

(56) References Cited

U.S. PATENT DOCUMENTS 2,971,911 A   2/1961   Caruso
3,282,836 A   11/1966  Lurton
(Continued)

FOREIGN PATENT DOCUMENTS

| CN | 1021904548 | 10/2012 |
|----|------------|---------|
| CN | 103710120 A | 4/2014 |
| EP | 6045581 | 7/1984 |

OTHER PUBLICATIONS

Jawich, et al, "Heptadecyl-tailed mono- and bis-imidazolines: A study of the newly synthesized compounds on the inhibition of mild steel corrosion in a carbon dioxide-saturated saline medium", Corrosion Science, vol. 65, Dec. 2012.
(Continued)

*Primary Examiner* — Anthony J Green
(74) *Attorney, Agent, or Firm* — Oblon, McClelland, Maier & Neustadt, L.L.P.

(57) ABSTRACT

An aminoalkyl imidazolines of the formula:

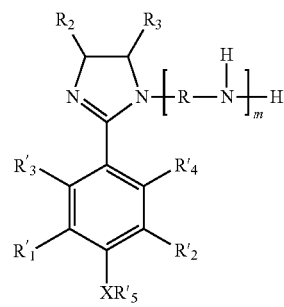

having p-octyloxy-, p-dodecyloxy-, or p-octadecyloxy-phenyl pendants as hydrophobes, for use to mitigate mild steel corrosion. An electron-rich aromatic ring, in conjugation with an amidine motif, imparts increasing corrosion inhibition efficiencies with an increasing hydrophobe chain length. X-ray photoelectron spectroscopy confirms the formation of an aminoalkyl imidazoline film on a metal surface prior to reaching a critical molar concentration.

14 Claims, 14 Drawing Sheets

(56) References Cited

U.S. PATENT DOCUMENTS

| | | | |
|---|---|---|---|
| 3,758,493 | A | 9/1973 | Maddox |
| 6,077,460 | A | 6/2000 | Oppenlander |
| 7,005,087 | B2 | 2/2006 | Tong |
| 2014/0083909 | A1 | 3/2014 | McDaniel |

OTHER PUBLICATIONS

Liu, et al., "The effect of hydrophilic group on the inhibition behavior of imidazoline for CO 2 corrosion of N80 in 3%NaCl solution", Corrosion Engineering Science and Technology; 43(1), Feb. 2008.

Cruz, et al., "Reactivity properties of derivatives of 2-imidazoline: an ab initio DFT study", Sep. 18, 2001, International Journal of Quantum Chemistry, vol. 85, Issue 4-5.

Fareles, et al., "Carbon Dioxide Corrosion Inhibition of Carbon Steel s Through Bis-imidazoline and Imidazoline Compounds Studied by EIS", Int. J. Electrochem. Sci.,5(2010) 797-814, Jun. 20, 2010.

Jafar Mazumder, et al., "The Effects of N-pendants and electron-rich amidine motifs in 2-(p-alkoxyphenyl)-2-imidazolines on mild steel corrosion in $CO_2$-saturated 0.5 M NaCl", Chemistry Department of King Fahd University of Petroleum and Minerals. Sep. 30, 2014, Corrosion Science 90 (2015) 54-68.

Dupin et al "Free and Wilson correlation between the molecular structure of some imidazoline and their corrosion inhibiting properties", Werkstoffe und Korrosion 33, 203-206 (1982).

Vera et al "QSPR Study of Corrosion Inhibitors, Imidazolines", Journal of the Chilean Chemical Society, vol. 51, No. 4, 1034-1035 (2006) On-line version ISSN 0717-9707.

CORROSION INHIBITION WITH ALKOXY AROMATIC IMIDAZOLINES

CROSS-REFERENCE TO RELATED APPLICATIONS

The present application is a Continuation of Ser. No. 14/727,393, pending, having a filing date of Jun. 1, 2015.

BACKGROUND OF THE INVENTION

The present disclosure is directed to the synthesis and preparation of imidazoline compounds and their use as corrosion inhibitors in metallic flow lines.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The oil and gas industries experience huge economic losses as a result of the damage corrosion inflicts on pipes, and other plaits systems. [S. Nesic, Key issues related to modelling of internal corrosion of oil and gas pipelines-A review, Corros. Sci. 49 (2007) 4308-4338. Incorporated herein by reference in its entirety.] Corrosion can be defined as the gradual degredation of a material by a chemical reaction of said material with its environment. It is noticeably problematic for materials that comprise a metal, as it can compromise, or even destroy, many of the metal's useful properties such as strength and appearance. In particular, corrosion has a detrimental effect on a metallic surface, such as the surfaces of steel sheeting and pipes, when these surfaces are placed in contact with petroleum and/or petroleum products.

Petroleum, herein defined as crude oil, has many constituents. The natural constituents of crude petroleum are known as petroleum products. These include, but are not limited to, gasoline, jet fuel, diesel fuel, heating oil, and other heavy fractions which result in the production of asphalt, tar, and paraffin wax. Surprisingly, although known to be vulnerable to corrosion, metals such as steel are commonly used throughout the petroleum industry to form the majority of pipelines transporting petroleum and petroleum products.

Steel itself can be classified by elasticity parameters and carbon content. For example, mild steel is an alloy comprised of metals and non-metals, along with a high amount of carbon. The oil and gas industries rely heavily on this type of steel to form pipes and pipelines in order to transport crude and refined oil. As such, these industries are increasingly concerned with the need to minimize corrosion in light of high economic replacement costs and ever-growing environmental safety concerns.

Environments that are warm, halic, and acidic are generally more corrosive to metals than those that are cooler, non-halic, and alkaline. Metal surfaces, in particular, experience electrochemical oxidation, or corrosion, when exposed to acidic (low pH) surroundings. This type of corrosion is particularly aggravated when metal parts and surfaces are in continuous contact with acidic aqueous environments, such as those occurring within pipelines carrying petroleum and/or petroleum products which have been obtained through an enhanced oil recovery process.

Enhanced oil recovery is defined as the implementation of various techniques for increasing the amount of crude oil that can be extracted from an oil field. Several techniques exist; however, gas injection, or miscible flooding, is presently the most commonly used approach in enhanced oil recovery. The term miscible flooding refers specifically to an injection processes that introduce miscible gases into a reservoir resulting in a displacement process. This displacement process maintains the reservoir pressure and moreover improves oil displacement, thus increasing oil recovery.

Although carious gases can be used for miscible flooding, hydrogen sulfide and carbon dioxide are the favored choices due to their low cost and viscosity reducing properties. Consequently, the corrosive environment encountered in oil wells is either anaerobic or aerobic, and contains 'sour' (containing hydrogen sulfide) or sweet (containing carbon dioxide) corrosive components.

"Sweet corrosion" can be further defined as the corrosion of carbon and low-alloy steel by carbonic acid and its derivatives. It is therefore evident that the high levels of $CO_2$ and/or $H_2S$ introduced during miscible flooding result in the formation of acidic aqueous conditions. Notably, contact between the metal surfaces of a pipeline system and the aqueous acidic petroleum products of an enhanced oil recovery process, can occur during all phases of hydrocarbon recovery and refining. Alloy technology has recently provided materials that can withstand the incidental contact of steel with corrosive components such as NaCl, $CO_2$ and/or $H_2S$, but the corrosion problem is intensified when there is no choice but to continuously contact steel with these components, as in the case of hydrocarbon exploration, recovery, and refining.

In addition to the level of acidity or alkalinity within a transport pipeline system, the level of corrosion is influenced by several other factors. These include, but are not limited to, the metallurgy and age of the pipeline, the temperature and pressure at which the pipeline is operated, the flow patterns, water accumulation, and turbulent intensity of the flow, the fluid chemistry concerning $CO_2$, $H_2S$, $O_2$, and NaCl content, the inherent corrosiveness of the fluid flowing through the pipeline, and the presence, or lack of, an inhibitor, and the ability of an existent inhibitor to maintain adhesion to the surface of the pipe in the transport pipeline system.

Metallurgy refers in part to the chemical composition and surface morphology of the pipeline. If mild steel is exposed to an aerated neutral aqueous solution, such as a dilute solution of sodium chloride in water, corrosive attack will begin at any defects found in a previously formed oxide film on said mild steel. These defects may be present as a result of mechanical damage such as scratches, or may be due to natural discontinuities in the film, i.e. inclusions, grain boundaries or dislocation networks at the surface of the steel.

At each defect the steel is exposed to the solution (electrolyte), an anodic reaction will occur, resulting in the formation of iron ions and free electrons. These electrons are then conducted through the oxide film to take part in a cathodic reaction at the surface of the film. This reaction requires the presence of dissolved oxygen in the electrolyte which furthers a response favoring the formation of hydroxyl ions. Thus, the surface morphology plays a distinct role in initiating the anodic reaction of a corrosive process.

Several methods exist to limit both the occurrence and progression of corrosion. They include the selection of a corrosion resistant material for the pipeline, such as stainless steel, plastics, and special alloys. Inert barriers, such as coatings and linings that are placed between the pipe wall and the flowing fluid also limit corrosion. These barriers are often applied in conjunction with cathodic protection systems. Additional measures include the use of chemical corrosion inhibitors. Chemical corrosion inhibitors are injected into the pipeline to reduce the pH, act as a barrier, and react with possible oxidizing agents. As such, chemical corrosion inhibitors have been the subject of considerable research.

In general, the choice of a corrosion inhibitor varies according to the nature of the corrosive environment. For example, in order to transport petroleum products, the oil industry uses large-diameter flow lines in oil field applications. Pipelines in these situations can transport large volumes of produced oil and water at extremely high flow rates from the field to a processing station at rates ranging up to 50 m/sec. The ability of an added corrosion inhibitor to completely cover the interior of the line, and subsequently, the ability of the added corrosion inhibitors to maintain adhesion to the interior of the line, depends on both the chemical adhesive properties of the inhibitor and the shear stress conditions which exist inside the line. Understandably, corrosion inhibitors with good adhesive qualities under high shear stress conditions are therefore necessitated.

Due to the eco-toxicity of many corrosion inhibitors, it is essential to use those inhibitors which are active at a concentration that does not harm the environment. Gas and oil production processes often take place offshore or along a coastline. If a corrosion inhibitor enters the sea or a stretch of fresh water, it can potentially harm microorganisms, and other aquatic life, and thus detrimentally effect the environment. Recent attempts have therefore been made to identify successful corrosion inhibitors which are less toxic to the environment than previously known inhibitors.

Many relevant inhibitor compositions are based upon amines, amides, or imidazolines; often in combination with other types of inhibitors. Imidazoline corrosion inhibitors exhibit both high efficiency and low toxicity, and furthermore, are advantageously synthesized from environmentally friendly raw materials.

In addition to their use in the petroleum industry, imidazolines can also limit corrosion in a solvent-based post combustion capture system, such as those which release large sources of $CO_2$ emissions. These include, but are not limited to, such systems as coal-fired power plants, refineries, cement manufacturing and the like, where corrosion can affect every part of the process equipment. Imidazolines can also be employed as inhibitors of corrosion formed on metallic surfaces resulting from exposure to a steam condensate. Examples include those generated from steam generating systems such as steam boilers, cooling water systems, and heat transfer water systems.

Currently, imidazolines are the most extensively used inhibitors to combat $CO_2$ corrosion. [V. Jovancicevic, S. Ramachandran, P. Prince, Inhibition of carbon dioxide corrosion of mild steel by imidazolines and their precursors, Corrosion 55 (1999) 449-455. X. Liu, S. Chen, H. Ma, G. Liu, L. Shen, Protection of iron corrosion by stearic acid and stearic imidazoline self-assembled monolayers, Appl. Surf. Sci. 253 (2006) 814-820. X. Liu, P. C. Okafor, Y. G. Zheng, The inhibition of $CO_2$ corrosion of N80 mild steel in single liquid phase and liquid/particle two-phase flow by aminoethyl imidazoline derivatives, Corros. Sci. 51 (2009) 744-751. P. C. Okafor, X. Liu, Y. G. Zheng, Corrosion inhibition of mild steel by ethylamino imidazoline derivative in $CO_2$-saturated solution, Corros. Sci. 51 (2009) 761-768. F. Farelas, A. Ramirez, Carbon dioxide corrosion inhibition of carbon steels through bis-imidazoline and imidazoline compounds studied by EIS, Int. J. Electrochem. Sci. 5 (2010) 797-814. M. W. S. Jawich, G. A. Oweimreen, S. A. Ali, Heptadecyl-tailed mono- and bis-imidazolines: A study of the newly synthesized compounds on the inhibition of mild steel corrosion in a carbon dioxide saturated saline medium, Corros. Sci. 65 (2012) 104-112. Incorporated herein by reference in their entirety.]

Imidazolines are defined as a class of heterocycles formally derived from imidazoles by the addition of $H_2$ across one of two double bonds. Three isomers are known: 2-imidazoline, 3-imidazoline, and 4-imidazoline. The 2- and 3-imidazolines contain an imine center and the 4-imidazoline contains an alkene group.

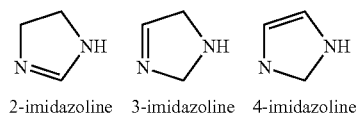

2-imidazoline   3-imidazoline   4-imidazoline

The chemical architecture of an imidazoline inhibitor frequently includes the following: a five-membered heterocycle containing an electron-rich hydrophilic amidine (N═C—N) group, a pendent side chain containing one or more electron-donor hydrophilic functional group(s) ($R_1$) and a hydrophobic alkyl chain ($R_2$) attached to the carbon atom of the amidine group, respectively (1).

(1)

The ring-nitrogens in imidazolines of structure (2) are weakly nucleophilic but are strong bases in compounds such as 1,8-diazabicyclo[5.4.0]undec-7-ene (DBU) ($pK_b$ 1.1) and 1,5-Diazabicyclo[4.3.0]non-5-ene (DBN) ($pK_b$ 0.5). [P. A. Koutentis, M. Koyioni, S. S. Michaelidou, Synthesis of [(4-Chloro-5H-1,2,3-dithiazol-5-ylidene)amino]azines, Molecules 16 (2011) 8992-9002. Incorporated herein by reference in its entirety.]

(2)

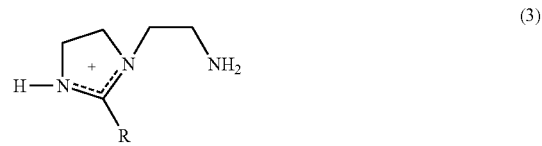

(3)

In the presence of $CO_2$, the bases are reported to form bicarbonate salts (3) in aqueous media: [W. Qiao, Z. Zheng, Q. Shi, Synthesis and properties of a series of $CO_2$ switchable surfactants with imidazoline group, J. Surfact. Deterg.

15 (2012) 533-539 D. J. Heldebrant, P. G. Jessop, C. A. Thomas, C. A. Eckert, C. L. Liotta. The Reaction of 1,8 Diazabicyclo[5.4.0]undec-7-ene (DBU) with carbon dioxide, J. Org. Chem. 70 (2005), 5335-5338. Incorporated herein by reference in their entirety.] Imidazolines, upon partial hydrolysis in aqueous solution, are converted into amides (4). [W. Qiao, Z. Zheng, Q. Shi, Synthesis and properties of a series of $CO_2$ switchable surfactants with imidazoline group, J. Surfact. Deterg. 15 (2012) 533-539 Incorporated herein by reference in its entirety].

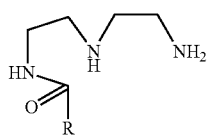

(4)

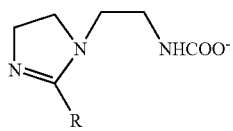

(5a)

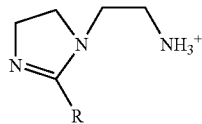

(6)

The reaction of an amine having a $pK_b$ of ≈4 in aqueous $CO_2$ solution is complex; [N. Ramachandran, A. Aboudheir, R. Idem, P. Tontiwachwuthikul, Kinetics of the absorption of $CO_2$ into mixed aqueous loaded solutions of monoethanolamine and methyldiethanolamine, Ind. Eng. Chem. Res. 45 (2006) 2608-2616. P. N. Sutar, A. Jha, P. D. Vaidya, E. Y. Kenig, Secondary amines for $CO_2$ capture: A kinetic investigation using N-ethylmonoethanolamine, Chem. Eng. J. 207-208 (2012) 718-724. Incorporated herein by reference in their entirety.] in addition to the formation of carbamate salts 5a & 5b, and bicarbonate salt 6, several ionic and neutral species such as $HCO_3^-$, $CO_3^{2-}$, $OH^-$, $H_3O^+$, $CO_2$ and $H_2O$ are also known to coexist. Due to the large number of compounds (1-6) and additional ionic species, it is difficult to ascertain with certainty which of the compounds (1-6) and/or ionic species are involved in imparting inhibitory properties, and thus, the mechanism by which an imidazoline imparts corrosion inhibition is complex and poorly understood.

Scheme 1: Reactions of imidazolines in aqueous $CO_2$ solution

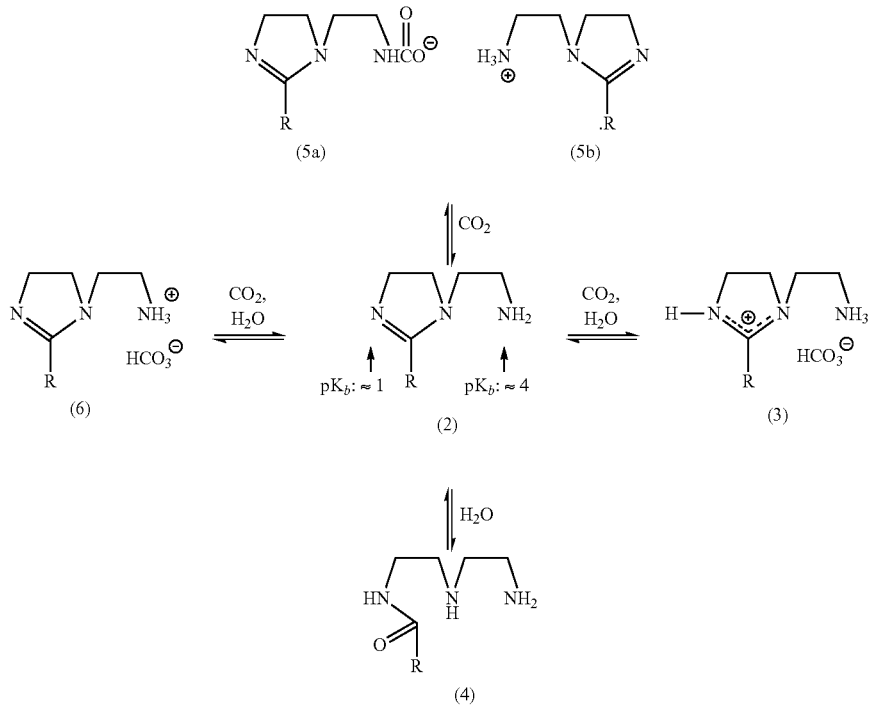

-continued

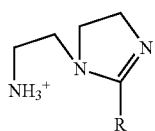

(5b)

Crude oil itself is corrosive to mild steel; $CO_2/H_2O$, injected into oil wells to increase production, [X. Jiang, Y. G. Zheng, D. R. Qu, W. Ke, Effect of calcium ions on pitting corrosion and inhibition performance in $CO_2$ corrosion of N80 steel, Corros. Sci. 48 (2006) 3091-3108 Incorporated herein in its entirety.] has been found to be more aggressive than hydrochloric acid at the same pH. [G. Zhang, C. Chen, M. Lu, C. Chai, Y. Wu, Evaluation of inhibition efficiency of an imidazoline derivative in $CO_2$-containing aqueous solution, Mater. Chem. Phys. 105 (2007) 331-340. U. Lotz, L. Van Bodegom, C. Ouwehand, The effect of type of oil or gas condensate on carbonic acid corrosion, Corrosion 47 (1991) 635-644, Incorporated herein by reference in their entirety.] It is not the dry $CO_2$, but rather its aqueous solution, which imparts corrosiveness. The enhanced corrosion is attributed to the increased cathodic reduction of the species $H^+$, $HCO_3^-$ as well as $H_2CO_3$, all of which are involved in mobile equilibria in an aqueous solution of $CO_2$. [F. F. Eliyan, A. Alfantazi, On the theory of $CO_2$ corrosion reactions— Investigating their interrelation with the corrosion products and API-X100 steel microstructure, Corros. Sci. 85 (2014) 380-393. Q. Y. Liu, L. J. Mao, S. W. Zhou, Effects of chloride content on $CO_2$ corrosion of carbon steel in simulated oil and gas well environments, Corros. Sci. 84 (2014) 165-171. Incorporated herein by reference in their entirety.]

The main reactions on the surface of the metal are represented by Eqs. (1)-(5) [F. F. Eliyan, A. Alfantazi, On the theory of $CO_2$ corrosion reactions—Investigating their interrelation with the corrosion products and API-X100 steel microstructure, Corros. Sci. 85 (2014) 380-393. Q. Y. Liu, L. J. Mao, S. W. Zhou, Effects of chloride content on $CO_2$ corrosion of carbon steel in simulated oil and gas well environments, Corros. Sci. 84 (2014) 165-171. K. Chokshi, W. Sun, S. Nesic, Iron carbonate scale growth and the effect of inhibition in $CO_2$ corrosion of mild steel, NACE International Corrosion Conference & Expo, Paper #05285, 2005 Incorporated herein by reference in their entirety]:

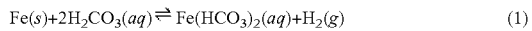
$$Fe(s)+2H_2CO_3(aq) \rightleftharpoons Fe(HCO_3)_2(aq)+H_2(g) \qquad (1)$$

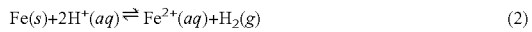
$$Fe(s)+2H^+(aq) \rightleftharpoons Fe^{2+}(aq)+H_2(g) \qquad (2)$$

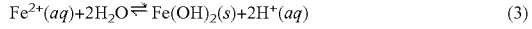
$$Fe^{2+}(aq)+2H_2O \rightleftharpoons Fe(OH)_2(s)+2H^+(aq) \qquad (3)$$

$$Fe(OH)_2(s) \rightleftharpoons FeO(s)+H_2O \qquad (4)$$

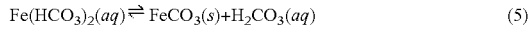
$$Fe(HCO_3)_2(aq) \rightleftharpoons FeCO_3(s)+H_2CO_3(aq) \qquad (5)$$

A coating of iron (II) carbonate on the metal surface is beneficial as it can minimize the rate of the corrosion process. [J. Han, D. Young, H. Colijn, A. Tripathi, S. Nesic, Chemistry and structure of the passive film on mild Steel in $CO_2$ corrosion environments, Ind. Eng. Chem. Res. 48 (2009) 6296-6302. Incorporated herein by reference in its entirety.] The solubility of iron (II) carbonate increases with an increase in temperature, while it dissolves at a lower pH values. Corrosion inhibitors, especially organic compounds containing electron-rich hetero-atoms, and alkyl chain hydrophobes, [F. Farelas, M. Galicia, B. Brown, N. Nesic, H. Castaneda, Evolution of dissolution processes at the interface of carbon steel corroding in a $CO_2$ environment studied by EIS, Corros. Sci. 52 (2010) 509-517. Incorporated herein by reference in its entirety.] are used to minimize mild steel corrosion. The inhibitor molecules may undergo physi- and/or chemisorption and form a hydrophobic barrier film to shield the hydrophobes from the hostile corrosive media. [F. Bentiss, M. Triasnel, H. Vezin, M. Lagrenee, Linear resistance model of the inhibition mechanism of steel in HCl by triazole and oxadiazole derivatives: Structure-activity correlations, Corros. Sci. 45 (2003) 371-380. Incorporated herein by reference in its entirety.]

The effects of hydrophilic and hydrophobic substituents of imidazolines on their inhibition efficiency (IE) have been discussed in some detail. [V. Jovancicevic, S. Ramachandran, P. Prince, Inhibition of carbon dioxide corrosion of mild steel by imidazolines and their precursors, Corrosion 55 (1999) 449-455, A. Edwards, C. Osborne, S. Webster, D. Klenerman, M. Joseph, P. Ostovar, M. Doyle, Mechanistic studies of the corrosion inhibitor oleic imidazoline, Corros. Sci. 36 (1994) 315-325. S. Ramachandran, B. L. Tsai, M. Blanco, H. Chen, Y. Tang, W. A. Goddard, III, The SAM mechanism for corrosion inhibition of iron by imidazolines, Langmuir 12 (1996) 6419-6428. X. Zhang, F. Wang, Y. He, Y. Du, Study of the inhibition mechanism of imidazoline amide on $CO_2$ corrosion of Armco iron, Corros. Sci. 43 (2001) 1417-1431. D. Wang, S. Yong, M. Wang, H. Xiao, Z. Chen, Theoretical and experimental studies of structure and inhibition efficiency of imidazoline derivatives, Corros. Sci. 41 (1999) 1911-1919. Incorporated herein by reference in their entirety.] Some suggest a greater role played by the N pendent [A. J. Szyprowski, Hydrogen sulphide corrosion of steel—Mechanism of action of imidazoline inhibitors, Proceeding of the Eighth European Symposium on Corrosion Inhibitor (8SEIC) Univ. Ferrara, (1995) 1229-1238. Incorporated herein by reference in its entirety.], while others indicate the opposite [A. Edwards, C. Osborne, S. Webster, D. Klenerman, M. Joseph, P. Ostovar, M. Doyle, Mechanistic studies of the corrosion inhibitor oleic imidazoline, Corros. Sci. 36 (1994) 315-325. Incorporated herein by reference in its entirety.] There are also contradictory reports on the importance of the length of the hydrophobic alkyl chain on corrosion inhibition. [V. Jovancicevic, S. Ramachandran, P. Prince, Inhibition of carbon dioxide corrosion of mild steel by imidazolines and their precursors, Corrosion 55 (1999) 449-455. S. Ramachandran, B. L. Tsai, M. Blanco, H. Chen, Y. Tang, W. A. Goddard, III, The SAM mechanism for corrosion inhibition of iron by imidazolines, Langmuir 12 (1996) 6419-6428. Incorporated herein by reference in their entirety.] The inhibition efficacy of the imidazolines is attributed to their ability to form a chemisorbed film on the iron surface. [V. Jovancicevic, S. Ramachandran, P. Prince, Inhibition of carbon dioxide corrosion of mild steel by imidazolines and their precursors, Corrosion 55 (1999) 449-45522. Edwards, C. Osborne, S. Webster, D. Klenerman, M. Joseph, P. Ostovar, M. Doyle, Mechanistic studies of the corrosion inhibitor oleic imidazoline, Corros. Sci. 36 (1994) 315-325. Incorporated herein by reference in their entirety.] The poorly understood and highly complex mechanism of $CO_2$ corrosion has, in the past, impeded the design of new molecules as inhibitors. [A. Edwards, C. Osborne, S. Webster, D. Klenerman, M. Joseph, P. Ostovar, M. Doyle, Mechanistic studies of the corrosion inhibitor oleic imidazoline, Corros. Sci. 36 (1994) 315-325. G. McIntire, J. Lippert, J. Yudelson, The effect of dissolved $CO_2$ and $O_2$ on the corrosion of iron, Corrosion 46 (1990) 91-95. Incorporated herein by reference in their entirety.]

Accordingly, corrosion inhibitors suitable for the protection of metals exposed to environments containing carbon dioxide, and exhibiting superior adhesive qualities under high shear stress conditions, are needed.

The above-described methods and compounds illustrate conventional techniques for preventing and inhibiting corrosion, and include the preparation and use of imidazolines as corrosion inhibitors. Accordingly, one objective of the present disclosure is to provide a series of imidazoline compounds and a method for their preparation.

BRIEF SUMMARY OF THE INVENTION

The present disclosure relates to a series of aminoalkyl imidazolines, and formulations thereof, for use as corrosion inhibitors.

In a first embodiment, the present invention is directed to an aminoalkyl imidazoline represented by the following structural formula (I)

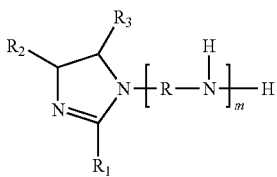

(I)

wherein m is an integer of 1 to 10; R is a $C_1$-$C_6$ alkylene; $R_1$ is selected from the group consisting of aromatic groups of formula (II)

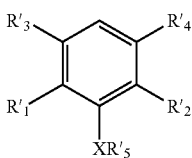

(II)

wherein X is a heteroatom independently selected from the group consisting of oxygen and sulfur;

$R'_1$ thru $R'_5$ are each independently selected from the group consisting of hydrogen, $C_1$-$C_{30}$ alkyl, alkenyl, aryl, alkylaryl, arylalkyl, aminoalkyl, and aminoaryl;

further wherein $R'_5$ is preferably a $C_5$-$C_{20}$ alkyl, most preferably a $C_8$-$C_{18}$ alkyl;

$R_2$ and $R_3$ are each independently selected from the group consisting of hydrogen, hydroxyl, halogen, $C_1$-$C_{30}$ alkyl, alkenyl, aryl, alkylaryl, arylalkyl, aminoalkyl, and aminoaryl, $(CH_2)_2COOH$, $CH_2CH(CH_3)COOH$ and imidazoline.

In a preferred embodiment, the aminoalkyl imidazoline of formula (I) comprises a 2-imidazoline ring substituted with an ethanamine group at a 5-N position of the 2-imidazoline ring, and a p-octyloxy phenyl group at a 1-C position of the 2-imidazoline ring; so as to provide a 1-(2-aminoethyl)-2-(4-octyloxypheny)-2-imidazoline.

In a preferred embodiment, the aminoalkyl imidazoline of formula (I) comprises a 2-imidazoline ring substituted with an ethanamine group at a 5-N position of the 2-imidazoline ring, and a p-dodecyloxy phenyl group at a 1-C position of the 2-imidazoline ring; so as to provide a 1-(2-aminoethyl)-2-(4-dodecyloxyphenyl)-2-imidazoline.

In a preferred embodiment, the aminoalkyl imidazoline of formula (I) comprises a 2-imidazoline ring substituted with an ethanamine group at a 5-N position of the 2-imidazoline ring, and a p-octadecyloxy phenyl group at the 1-C position of the 2-imidazoline ring; so as to provide a 1-(2-aminoethyl)-2-(4-octadecyloxyphenyl)-2-imidazoline.

In a preferred embodiment, the aminoalkyl imidazoline of formula (I) comprises a 2-imidazoline ring substituted with a $N^1$-(2-aminoethyl)-$N^2$-ethylethane-1,2-diamine group at a 5-N position of the 2-imidazoline ring, and a p-octyloxy phenyl group at a 1-C position of the 2-imidazoline ring; so as to provide a 1-[2-{2-(2-aminoethylamino)ethylamino}ethyl]-2-(4-octyloxyphenyl)-2-imidazoline.

In a preferred embodiment, the aminoalkyl imidazoline of formula (I) comprises a 2-imidazoline ring substituted with a $N^1$-(2-aminoethyl)-$N^2$ethylethane-1,2-diamine group at a 5-N position of the 2-imidazoline ring, and a p-dodecyloxy phenyl group at a 1-C position of the 2-imidazoline ring; so as to provide a 1-[2-{2-(2-aminoethylamino)ethylamino}ethyl]-2-(4-dodecyloxyphenyl)-2-imidazoline.

In a preferred embodiment, the aminoalkyl imidazoline of formula (I) comprises a 2-imidazoline ring substituted with a $N^1$-(2-aminoethyl)-$N^2$-ethylethane-1,2-diamine group at a 5-N position of the 2-imidazoline ring, and a p-octadecyloxy phenyl group at the 1-C position; so as to provide a 1-[2-{2-(2-aminoethylamino)ethylamino}ethyl]-2-(4-octadecyloxyphenyl)-2-imidazoline.

In a further embodiment, the aminoalkyl imidazolines of formula (I) are used in a process for preventing or reducing corrosion of a metallic flow line.

In a further embodiment, the aminoalkyl imidazolines of formula (I) are prepared by reacting a nitrile with a polyethylene polyamine in the presence of an acid catalyst at a temperature ranging from 140° C.-150° C.

In a preferred embodiment, the aminoalkyl imidazoline of formula (I) is prepared by reacting diethylene triamine (DETA) with 4-(octyloxy) cyclohexanecarbonitrile in the presence of a cysteine HCl catalyst at a temperature of 145° C. to yield 1-(2-aminoethyl)-2-(4-octyloxyphenyl)-2-imidazoline.

In a preferred embodiment, the aminoalkyl imidazoline of formula (I) is prepared by reacting diethylene triamine (DETA) with 4-(dodecyloxy) cyclohexanecarbonitrile in the presence of a cysteine HCl catalyst at a temperature of 145° C. to yield 1-(2-aminoethyl)-2-(4-dodecyloxyphenyl)-2-imidazoline.

In a preferred embodiment, the aminoalkyl imidazoline of formula (I) is prepared by reacting diethylene triamine (DETA) 4-(octadecyloxy) cyclohexanecarbonitrile in the presence of a cysteine HCl catalyst at a temperature of 145° C. to yield 1-(2-aminoethyl)-2-(4-octadecyloxyphenyl)-2-imidazoline.

In a preferred embodiment, the aminoalkyl imidazoline of formula (I) is prepared by reacting tetraethylene pentamine (TEPA) with 4-(octyloxy) cyclohexanecarbonitrile in the presence of a cysteine HCl catalyst at a temperature of 145° C. to yield 1-[2-{2-(2-aminoethylamino)ethylamino}ethyl]-2-(4-octyloxyphenyl)-2-imidazoline.

In a preferred embodiment, the aminoalkyl imidazoline of formula (I) is prepared by reacting tetraethylene (TEPA) with 4-(dodecyloxy) cyclohexanecarbonitrile in the presence of a cysteine HCl catalyst at a temperature of 145° C. to yield 1-[2-{2-(2-aminoethylamino)ethylamino}ethyl]-2-(4-dodecyloxyphenyl)-2-imidazoline.

In a preferred embodiment, the aminoalkyl imidazoline of formula (I) is prepared by reacting tetraethylene pentamine (TEPA) with 4-(octadecyloxy) cyclohexanecarbonitrile in the presence of a cysteine HCl catalyst at a temperature of 145° C. to yield 1-[2-{2-(2-aminoethylamino)ethylamino}ethyl]-2-(4-octadecyloxyphenyl)-2-imidazoline.

In a further embodiment, an aminoalkyl imidazoline of formula (I) is present in a composition further comprising one or more additives selected from the group comprising surfactants, intensifiers, solvents, oil-wetting components, dispersants biocides and/or scale inhibitors.

In another embodiment, the present disclosure includes a method for preventing or reducing corrosion comprising adding to a process stream an effective corrosion inhibiting amount of one or more aminoalkyl imidazolines of formula (I)

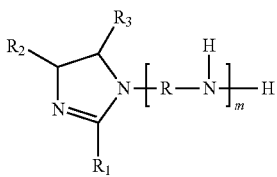

(I)

wherein m is an integer of 1 to 10; R is a $C_1$-$C_6$ alkylene; $R_1$ is selected from the group consisting of aromatic hydrocarbons of formula (II)

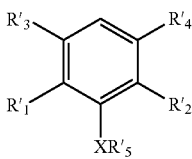

(II)

wherein X is a heteroatom independently selected from the group consisting of oxygen and sulfur;

$R'_1$ thru $R'_5$ are each independently selected from the group consisting of hydrogen, $C_1$-$C_{30}$ alkyl, alkenyl, aryl, alkylaryl, arylalkyl, aminoalkyl, and aminoaryl;

further wherein $R'_5$ is preferably a $C_5$-$C_{20}$ alkyl, most preferably a $C_8$-$C_{18}$ alkyl;

$R_2$ and $R_3$ are each independently selected from the group consisting of hydrogen, hydroxyl, halogen, $C_1$-$C_{30}$ alkyl, alkenyl, aryl, alkylaryl, arylalkyl, aminoalkyl, and aminoaryl, $(CH_2)_2COOH$, $CH_2CH(CH_3)COOH$ and imidazoline.

In a further embodiment, the aminoalkyl imidazoline is added to the process stream at a dosage of 0.1 ppm to 10,000 ppm by weight of the aminoalkyl imidazoline.

In a further embodiment, the aminoalkyl imidazoline is added to the process stream at a dosage of 1.0 ppm to 1000 ppm by weight of the aminoalkyl imidazoline.

In a most preferred embodiment, the aminoalkyl imidazoline is added to the process stream at a dosage of 1.0 ppm to 500 ppm by weight of the aminoalkyl imidazoline.

In a further embodiment, the process stream comprises at least one constituent selected from the group consisting of water, petroleum and/or petroleum products, and at least one constituent selected from the group consisting of carbon dioxide ($CO_2$), hydrogen sulfide ($H_2S$), oxygen ($O_2$), and NaCl.

In a further embodiment the aminoalkyl imidazoline is added continuously to the process stream.

In a further embodiment the aminoalkyl imidazoline is added intermittently to the process stream.

In a further embodiment the aminoalkyl imidazoline suppresses an anodic reaction of a metal corrosive process.

In a preferred embodiment, the metal is a mild steel.

In another aspect, the disclosure relates to a method of inhibiting corrosion of a metal surface undergoing continuous and/or intermittent contact with a process stream wherein said process stream comprises water and/or hydrocarbons, comprising;

applying at least one aminoalkyl imidazoline compound of the first embodiment to a surface of a metal, wherein said applying comprises a spraying or a dipping of a metal surface and/or an adding to said process stream contacting said metal surface, of said imidazoline so as to cover and maintain an effective application on at least one surface of a metal in contact with said process stream;

wherein said effective concentration comprises an amount of 0.1 ppm to 10,000 ppm by weight of the aminoalkyl imidazoline; preferably 1.0 ppm to 1,000 ppm by weight of, most preferably 1.0 ppm to 500 ppm parts by weight of the aminoalkyl imidazoline;

wherein the aminoalkyl imidazoline is added to a metallic flow line continuously or intermittently so as to maintain an effective corrosion inhibiting dose;

wherein said aminoalkyl imidazoline mainly suppresses an anodic reaction of a metal corrosive process.

In a further embodiment, the metallic flow line comprises mild steel.

In a further embodiment, a flow rate of the process stream through the metallic flow line ranges from 0-50 m/sec.

In a further embodiment a flow rate of the process stream through the metallic flow line ranges from 10-30 m/sec.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
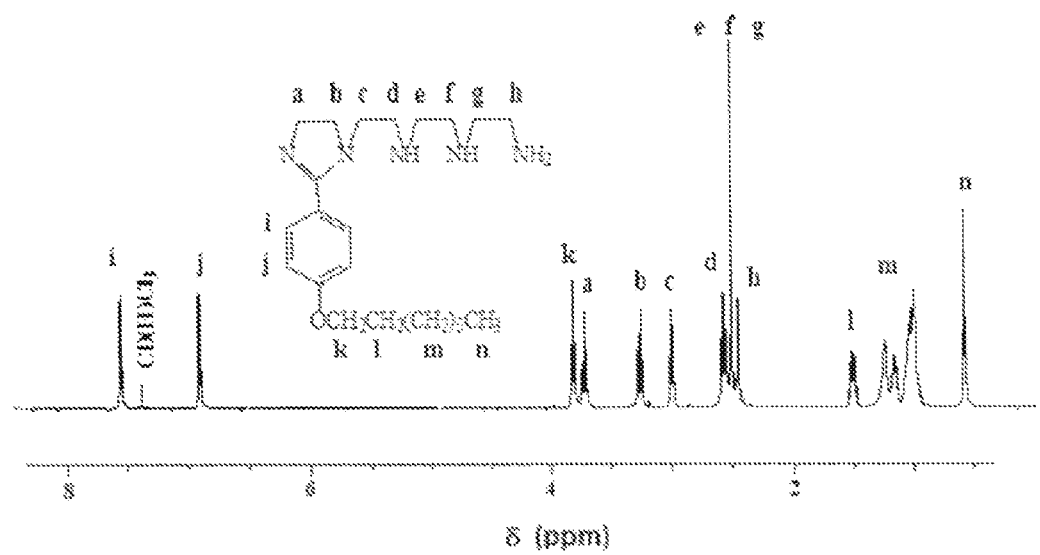
FIG. 1 shows an $^1H$ NMR spectra of the imidazolines (IXa) in $CDCl_3$.
Figure 2:
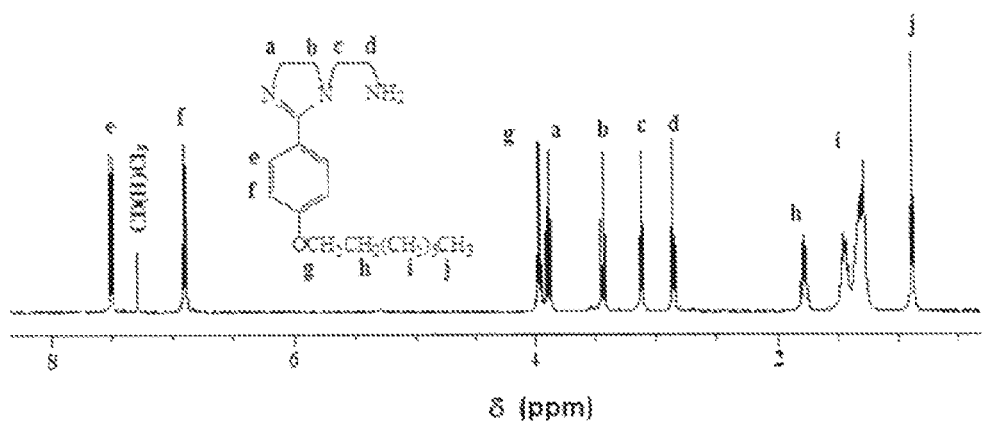
FIG. 2 shows an $^1H$ NMR spectra of the imidazolines (VIIIa) in $CDCl_2$.

Referring now to the drawings, wherein like reference numerals designate identical or corresponding parts throughout the several views.

Aminoalkyl imidazolines of this disclosure effectively prevent and/or inhibit the formation of corrosion on metal materials and equipment, such as metallic flow lines, used in a process for producing and/or transporting petroleum and petroleum products. Furthermore, the aminoalkyl imidazolines of this disclosure effectively prevent and/or inhibit the formation of corrosion on metal materials and equipment, such as metallic pipelines, in a process comprising producing and/or transport a process stream. The aminoalkyl imidazolines of this disclosure also mitigate the corrosion of metal materials and equipment employed in related processes wherein steam or other corrosive fluids and/or gases are contained in a process stream.

Methods of reducing corrosion comprise adding to a process stream an effective corrosion inhibiting amount of one or more of the aminoalkyl imidazolines as disclosed herein. Said processes include, but are not limited to, processes involving cleaning and hydrocarbon recovery operations. With respect to oil and gas production, it is well known that during the production life of an oil or gas well, the production zone, including tubular goods, downhole tools and other equipment within the well, may be exposed to corrosive conditions. With respect to the process stream, a stream comprising a fluid such as, but not limited to, water, petroleum, petroleum products, and hydrocarbons wherein said fluid may be found in a liquid or vapor phase in said stream, forms an aqueous and/or petroleum phase. Said stream may further comprise carbon dioxide ($CO_2$), hydrogen sulfide ($H_2S$,) and/or NaCl, and, in combination with the aqueous and/or a petroleum phase, form the process stream.

As an amount of the aminoalkyl imidazoline compounds disclosed herein can be used to inhibit corrosion of metals in acid and/or alkaline environments, the amount that is defined for use is dependent on the particular environment that it is intended for. A suitable amount, or proportion, or dosage, can be determined empirically by taking into account parameters such as, but not limited to, the nature of the process stream and the proportion of corrosive species therein, the nature of the metal being protected, the flow rate of the process stream, the temperature and pressure of said process stream, and the amount of time said metal is contacted by the process stream.

Herein, ppm is defined as the amount of inhibitor as found in a process stream by weight of the inhibitor. The aminoalkyl imidazoline inhibitor is preferably added to the process stream at a dosage of 0.1 ppm to 10,000 ppm by weight of the aminoalkyl imidazoline, more preferably at a dosage of 1.0 to 1000 ppm by weight of the aminoalkyl imidazoline, and most preferably at a dosage of 10 to 500 ppm by weight of the aminoalkyl imidazoline. Furthermore, the corrosion inhibitors as individually disclosed herein may be used singularly (neat), or in combination—with or without blending together—to enhance a corrosion inhibition performance.

For handling, injection and distribution, any number or combination of other components may be added to the herein disclosed aminoalkyl imidazolines to formulate them into a liquid form, or otherwise formulate them in order to enhance their performance. The components comprise surfactants, intensifiers, solvents, oil-wetting components and/or dispersants. Suitable components, which are also compatible with the process, include, but are not limited to, water, fatty acid esters, ethylated alcohols, sodium sulfonate, isopropanol, aliphatic distillates, aromatics, heptane, di-isobutyl ketone, methyl isobutyl ketone, glycols, high boiling oils, xylene, toluene, and naphtha.

The imidazoline inhibitor may also be used in combination with other materials commonly employed in corrosion inhibiting compositions such as, but not limited to, scale inhibitors and biocides.

The aminoalkyl imidazoline, and any additives such as the above mentioned solvents and/or dispersants, can be injected directly into the process stream by, but not limited to, (a) injection at different locations into the process stream, (b) as separate formulations injected at the same location, or (c) injection together as part of a single combined formulation. It is also within the scope of this disclosure to have several injection sites located at various distance intervals along a pipeline containing a process stream so as to present said aminoalkyl imidazolines to a process stream environment in which they are most suited to inhibit corrosion. In a preferred embodiment, the aminoalkyl imidazolines are added continuously. In another preferred embodiment, the aminoalkyl imidazolines are added intermittently.

In a further embodiment, the adding to a process stream of an effective corrosion inhibitor(s) comprises introducing, adding or injecting at least one imidazoline of this disclosure through a member or conduit positioned within an initial proximal portion of a pipeline or well carrying a process stream. The process stream may contain compounds such as, but not limited to, water, petroleum, petroleum products, hydrocarbons, and acidic species such as $CO_2$ and/or $H_2S$, and NaCl. The methods herein also encompass a plurality of injection sites located at various intervals along said pipeline, or well, carrying said process stream, for additional injection of said imidazoline compounds tailored to treat corrosion at a specific site of the pipeline or well.

Furthermore, inhibition of corrosive process of a metal, such as mild steel, can occur by mitigating the corrosion found at a metal surface to contact with a process stream. Said process stream as previously defined, includes, but is not limited to, water, petroleum, petroleum products, hydrocarbons, and acidic species such as $CO_2$ and/or $H_2S$, and NaCl. Said inhibition of the corrosion comprises administering an effective concentration of an aminoalkyl imidazoline of this disclosure. Administering comprises applying at least one aminoalkyl imidazoline compound of the disclosure to a surface of a metal, wherein said applying comprises a spraying or a dipping of a metal surface and/or an adding to said process stream contacting said metal surface, of said imidazoline so as to cover and maintain an effective application on at least one surface of a metal in contact with said process stream.

The aminoalkyl imidazolines of this invention mainly suppresses an anodic reaction of the metal corrosive process, and maintain adhesion to said metal surface when the flow rate of a process stream within a flow line ranges between 0-50 m/sec. Preferably, the aminoalkyl imidazolines of this invention mainly suppresses an anodic reaction of the metal corrosive process, and maintain adhesion to said metal surface when the flow rate of a process stream within a flow line ranges between 10-30 m/sec.

As used herein the term "alkenyl" is a monovalent group derived from a straight or branched chain hydrocarbon containing one or more carbon-carbon double bonds. Illustrative alkenyl groups include, but are not limited to, groups such as ethenyl, propenyl, butenyl, and 1-methyl-2-buten-1-yl.

As used herein the term "alkoxy" is an alkyl-O— group where alkyl is defined herein. Illustrative alkoxy groups include, but are not limited to, groups such as methoxy, ethoxy, propoxy, butoxy, octyloxy, dodecyloxy and octadecyloxy. Related to alkoxy groups are "aryloxy" groups, which have an aryl group singular bonded to oxygen such as the phenoxy group ($C_6H_5O$—).

As used herein the term "alkyl" is a monovalent group derived from a straight or branched chain saturated hydrocarbon by the removal of a single hydrogen atom. Illustrative alkyl groups include, but are not limited to, groups such as ethyl, n- and iso-propyl, n-, sec-, iso- and tert-butyl, lauryl, octyl, dodecyl, and octadecyl.

As used herein the term "alkylaryl" an alkyl-arylene-group where alkyl and arylene are defined herein. Illustrative alkylaryl groups include, but are not limited to, groups such as tolyl, ethylphenyl, propylphenyl, 4-(octyloxy)benzonitrile, 4-(dodecyloxy)benzonitrile, and 4-(octadecyloxy)benzonitrile.

As used herein the term "alkylene" is a divalent group derived from a straight or branched chain saturated hydrocarbon by the removal of two hydrogen atoms. Illustrative alkylene groups include, but are not limited to, groups such as methylene, ethylene, propylene, and isobutylene.

As used herein the term "amino" is a group of formula $Y^1Y^2N$— and quaternary salts thereof where $Y^1$ and $Y^2$ are independently hydrogen, alkyl, aryl, heterocycyl or arylalkyl as defined herein. $Y^1$ and $Y^2$, together with the N atom to which they are attached may also form a heterocyclyl group. Illustrative amino groups include, but are not limited to, groups such as amino (—$NH_2$), methylamino, ethylamino, iso-propylamino, tert-butylamino, dimethylamino, diethylamino, methylethylamino, and piperidino.

As used herein the term "aminoalkyl" is an amino-alkylene-group wherein amino and alkylene are defined herein. Illustrative aminoalkyl groups include, but are not limited to, groups such as 3-dimethylaminopropyl, and dimethylaminoethyl.

As used herein the term "aminoaryl" is an amino-arylene-group where amino and arylene are defined herein.

As used herein the term "aryl" means substituted and un-substituted aromatic carbocyclic radicals and substituted and un-substituted aromatic heterocyclic radicals having 5 to 10 ring atoms. Illustrative aryl groups include, but are not limited to groups such as phenyl, and naphthyl.

The aryl may optionally be substituted with one or more groups selected from, but not limited to, groups such as hydroxyl, halogen, $C_1$-$C_{18}$ alkyl, $C_1$-$C_{30}$ thiol alkyl and $C_1$-$C_{30}$ alkoxy; wherein said alkyl and thiol alkyl is preferably selected from the group consisting of a $C_5$-$C_{20}$ alkyl; most preferably from the group consisting of a $C_8$-$C_{18}$ alkyl.

As used herein the term "arylalkyl" is an aryl-alkylene-group wherein aryl and alkylene are defined herein. Representative arylalkyl include, but are not limited to, benzyl, phenylethyl, phenylpropyl, and 1-naphthylmethyl.

As used herein, the term "arylene" is a substituent of an organic compound that is derived from an aromatic hydrocarbon (arene) that has had a hydrogen atom removed from a ring carbon atom. Representative arylene include, but are not limited to, phenylene.

As used herein, the term "heterocyclyl" means an aromatic or non-aromatic monocyclic or multicyclic ring system of about 3 to about 10 ring atoms, preferably about 5 to about 10 ring atoms, in which one or more of the atoms in the ring system is/are element(s) other than carbon, for example nitrogen, oxygen or sulfur. Preferred ring sizes of rings of the ring system include about 5 to about 6 ring atoms. The heterocyclyl is optionally substituted by one or more hydroxy, alkoxy, amino or thiol groups. Representative heterocyclyl rings include, but are not limited to, piperidyl, pyrrolidinyl, piperazinyl, and morpholinyl.

"Preventing" includes preventing, inhibiting, mitigating and reducing.

Imidazolines comprise a class of nitrogen-containing heterocycles formally derived from imidazoles by the addition of hydrogen ($H_2$) across one of two double bonds. The 2-imidazoline (dihydroimidazole) of the disclosure contains an imine center, and is one of three isomers with the formula $C_3H_6N_2$.

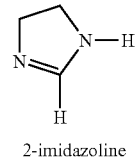

2-imidazoline

The 2-imidazoline compound as disclosed herein is substituted at the 5-N position and the 1-C position of the 2-imidazoline ring with the following chemical groups, respectively:

a. A nitrogen containing functional group selected from the group comprising: an amine, defined as a functional group that contains a basic nitrogen atom with a lone pair of electrons; a diamine, comprising a type of polyamine with two amino groups; or a polyamine, comprising two or more primary amino groups. Herein, the nitrogen containing functional group is defined as:

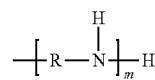

wherein m is an integer of 1 to 10 and R is a $C_1$-$C_6$ alkylene;

b. A phenyl ether (phenyl-O—$R'_5$) or phenyl thiol ether (phenyl-S—$R'_5$)

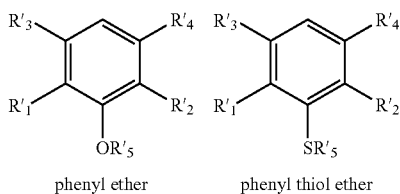

phenyl ether          phenyl thiol ether wherein said phenyl ether comprises a phenyl group p-substituted with orientation to said 2-imidazoline group with an O—$R'_5$ group; wherein is selected from the group comprising a $C_1$-$C_{30}$ alkyl group; more preferably a $C_5$-$C_{20}$ alkyl group, more preferably a $C_{10}$-$C_{15}$ alkyl group, more preferably a $C_{12}$-$C_{16}$ alkyl group, most preferably a $C_8$-$C_{18}$ alkyl group, so as to provide a p-alkoxy phenyl pendant, or:

wherein said phenyl thiol ether comprises a phenyl group p-substituted with orientation to said 2-imidazoline group with an S—$R'_5$ group; wherein $R'_5$ is selected from the group comprising a $C_1$-$C_{30}$ alkyl group; more preferably a $C_5$-$C_{20}$ alkyl group, most preferably a $C_8$-$C_{18}$ alkyl group so as to provide a p-thiol alkyl phenyl pendant.

As previously defined herein, the structure of the aminoalkyl imidazolines of this disclosure comprise a:

2-imidazoline substituted with:
an amine, diamine, polyamine, or repeating units thereof, at the 5-N position of the imidazoline ring; and
a p-alkoxy phenyl, or
a p-thiol alkyl phenyl pendant.

The preferred structure of the compound as disclosed herein comprises:

2-imidazoline substituted with:
ethanamine or $N^1$-(2-aminoethyl)-$N^2$ethylethane-1,2-diamine at the 5-N position of the imidazoline ring,

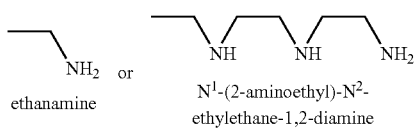

ethanamine    $N^1$-(2-aminoethyl)-$N^2$-ethylethane-1,2-diamine and a phenyl ether or a phenyl thiol ether group at the 1-C position of the 2-imidazoline ring;

wherein said phenyl ether is para-bonded to an alkyl group selected from the group consisting of a $C_8$, $C_{12}$ or $C_{18}$ alkyl so as to form a p-octyloxy-, p-dodecyloxy, or p-octadecyloxy-phenyl pendant, or wherein said phenyl thiol ether is para-bonded to an alkyl group selected from the group consisting of a $C_8$, $C_{12}$ or $C_{18}$ alkyl so as to form a p-octyl(phenyl)sulfane, p-dodecyl(phenyl)sulfane, or p-octadecyl(phenyl)sulfane pendant.

It is also within the scope of the disclosure to provide further substitutions onto the imidazoline, phenyl and/or phenoxy ring(s) so as to provide a structure comprising the formula:

wherein m is an integer of 1 to 10; R is a $C_1$-$C_6$ alkylene; preferably a branched or linear ethylene —$CH_2CH_2$—, propylene —$CH_2CH_2CH_2$—, butylene —$CH_2CH_2CH_2CH_2$—, or pentylene —$CH_2CH_2CH_2CH_2CH_2$— group, X is a heteroatom independently selected from the group consisting of oxygen and sulfur;

$R'_1$ thru $R'_5$ are each independently selected from the group consisting of hydrogen, $C_1$-$C_{30}$ alkyl, alkenyl, aryl, alkylaryl, arylalkyl, aminoalkyl, and aminoaryl, preferably $R'_1$-$R'_4$ are hydrogen atoms and $R'_5$ is a $C_6$-$C_8$ alkyl group, more preferably a $C_{10}$-$C_{30}$ alkyl group, more preferably a $C_{12}$-$C_{18}$ alkyl group, most preferably a $C_{14}$-$C_{16}$ alkyl group;

$R_2$ and $R_3$ are each independently selected from the group consisting of hydrogen, hydroxyl, halogen, $C_1$-$C_{30}$ alkyl, alkenyl, aryl, alkylaryl, arylalkyl, aminoalkyl, aminoaryl, $(CH_2)_2COOH$, $CH_2CH(CH_3)COOH$ and imidazoline, preferably $R_2$ and $R_3$ are hydrogen atoms.

Specific compounds encompassed by the general formula include:
1-(2-aminoethyl)-2-(4-octyloxyphenyl)-2-imidazoline,
1-(2-aminoethyl)-2-(4-odecyloxyphenyl)-2-imidazoline,
1-(2-aminoethyl)-2-(4-octadecyloxyphenyl)-2-imidazoline,
1-[2-{2-(2-aminoethylamino)ethylamino}ethyl]-2-(4-octyloxyphenyl)-2-imidazoline,
1-[2-{2-(2-aminoethylamino)ethylamino}ethyl]-2-(4-dodecyloxyphenyl)-2-imidazoline, and
1-[2-{2-(2-aminoethylamino)ethylamino}ethyl]-2-(4-octadecyloxyphenyl)-2-imidazoline.

The compounds of the present invention may include stereoisomers such as optical isomers, diastereoisomers and geometrical isomers, or tautomers depending upon the mode of substituents. Thus, the compounds of the present disclosure include all of the stereoisomers, tautomers, and a mixture thereof.

Also, polymorphs, hydrates, and solvates of the compounds of the present disclosure are included within the scope of the disclosure.

The synthesis process used to prepare the aminoalkyl imidazolines of this disclosure initially involve the preparation of alkyloxybenzoic acids having a formula of R—O—R'CO$_2$H wherein R is $C_2$-$C_{30}$ alkyl or alkenyl, and R' is an optionally substituted aryl group. The R hydrophobe is selected from the group comprising a $C_1$-$C_{30}$ alkyl; preferably a $C_5$-$C_{20}$ alkyl, most preferably a $C_8$-$C_{18}$ alkyl. The alkyloxybenzoic acids are further reacted to obtain an alkoxybenzamide, which is subsequently reacted to obtain an alkoxybenzonitrile. The use of the alkoxybenzonitrile as a starting material for the synthesis of a series of aminoalkyl imidazolines is described herein. Furthermore, the corrosion inhibition properties of said compounds are also presented herein.

The syntheses of the class of imidazolines from p-alkoxy-benzonitrile and oligoamines $H_2N(CH_2CH_2NH)_n$—H (n=2 and 4) are outlined in Scheme 2, wherein R is selected from the group consisting of $C_8H_{17}$, $C_{12}H_{25}$, and $C_{18}H_{37}$. Starting nitriles, 4-(octyloxy)benzonitrile (a), 4-(dodecyloxy)benzonitrile (b), and 4-(octadecyloxy)benzonitrile (c) are shown below.

Scheme 2: The synthesis of imidazolines from p-alkoxybenzonitrile amd oligoamines

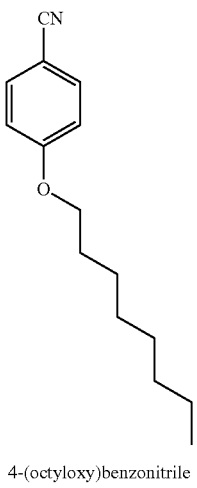

4-(octyloxy)benzonitrile

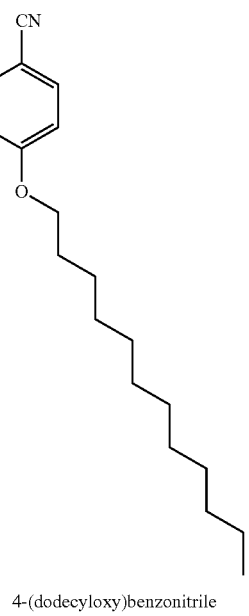

4-(dodecyloxy)benzonitrile

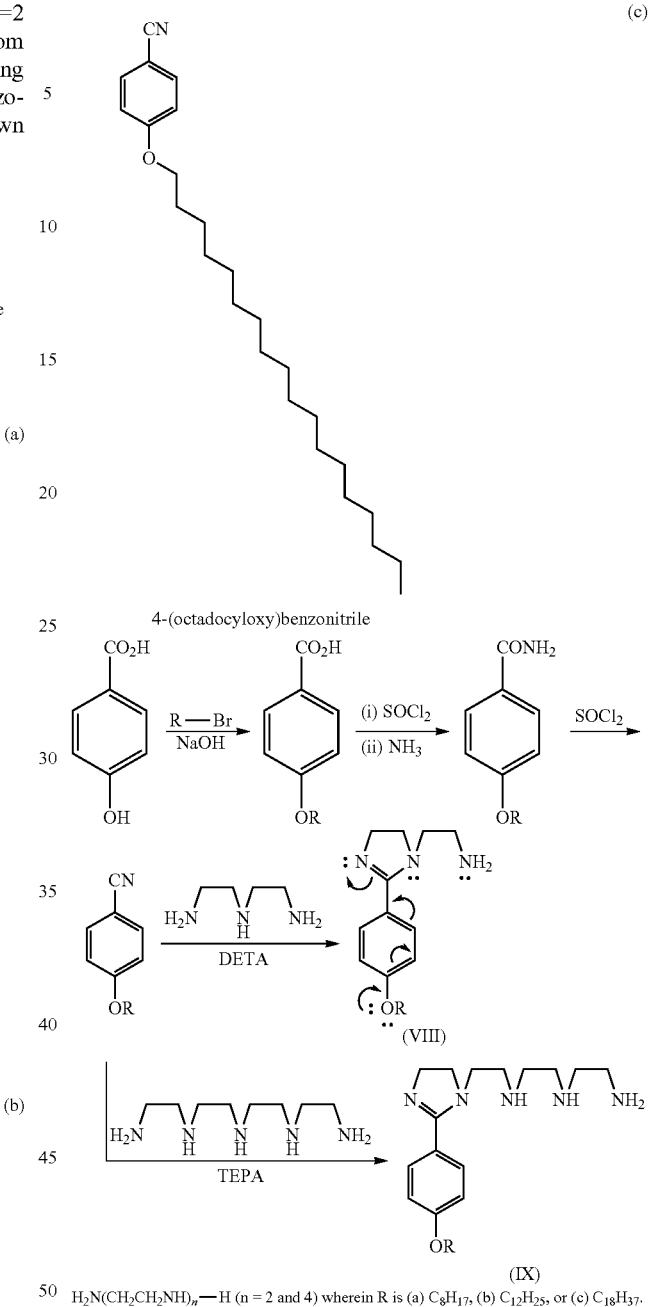

4-(octadocyloxy)benzonitrile $H_2N(CH_2CH_2NH)_n$—H (n = 2 and 4) wherein R is (a) $C_8H_{17}$, (b) $C_{12}H_{25}$, or (c) $C_{18}H_{37}$.

Polyalkylene polyamines used to prepare the aminoalkyl imidazolines of this disclosure have the formula

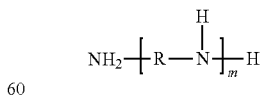

where R is $C_1$-$C_6$ alkylene and m is an of 1 to 10. "Polyethylene polyamine" means a polyalkylene polyamine where R is —$CH_2CH_2$—. Representative polyalkylene polyamines include diethylene triamine (DETA), triethylene tetramine, tripropylene tetramine, tetraethylene pentamine (TEPA), and pentaethylene hexamine.

Herein an aminoalkyl imidazoline is prepared by reacting an alkoxybenzonitrile with diethylene triamine (DETA) in an exact 1:2.5 mmolar ratio to yield an 1-(2-aminoethyl)-2-(4-octyloxyphenyl)-2-imidazoline (VIIIa), an 1-(2-aminoethyl)-2-(4-dodecyloxyphenyl)-2-imidazoline (VIIIb), or an 1-(2-aminoethyl)-2-(4-octadecyloxyphenyl)-2-imidazoline (VIIIc).

importance of hydrophobe chain length on the inhibition of $CO_2$ corrosion. The N-pendent groups of $CH_2CH_2NH_2$ and $(CH_2CH_2NH)_2CH_2CH_2NH_2$, allow comparison of these chains and their role in the suppression of the corrosion of mild steel in $CO_2/0.5$ M NaCl solutions. The corrosion inhibition studies of this disclosure utilized potentiodynamic polarizations, gravimetric weight loss and X-ray photoelec-

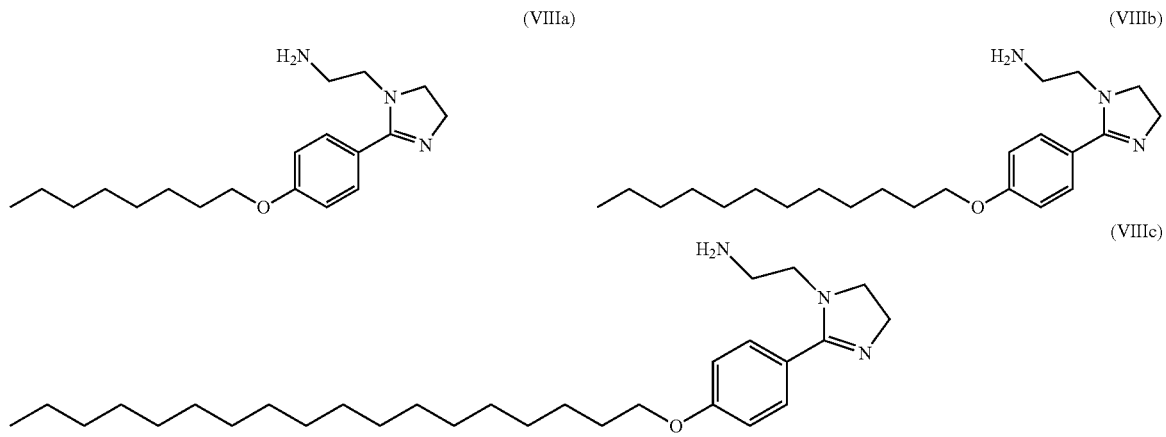

Further herein, an aminoalkyl imidazoline is prepared by reacting an alkoxybenzonitrile with tetraethylene pentamine (TEPA) in an exact 1:2.5 mmolar ratio to yield an 1-[2-{2-(2-aminoethylamino)ethylamino}ethyl]-2-(4-octyloxyphenyl)-2-imidazoline (IXa), 1-[2-{2-(2aminoethylamino)ethylamino}ethyl]-2-(4-dodecyloxyphenyl)-2-imidazoline (IXb), or an 1-[2-{2-(2-aminoethylamino)ethylamino}ethyl]-2-(4-octadecyloxyphenyl)-2-imidazoline (IXc).

tron spectroscopy (XPS) to assist in clarifying the inhibition mechanism.

One common structural component in the imidazolines of this disclosure is the placement of an aromatic ring in conjunction with the N═C—N group. This allows the shifting of the charge density from the electron-rich benzene ring to the imidazolines as shown using structure VIII (Scheme 2). This stabilizing electron movement results in the two rings becoming coplanar. As a result, the electron-

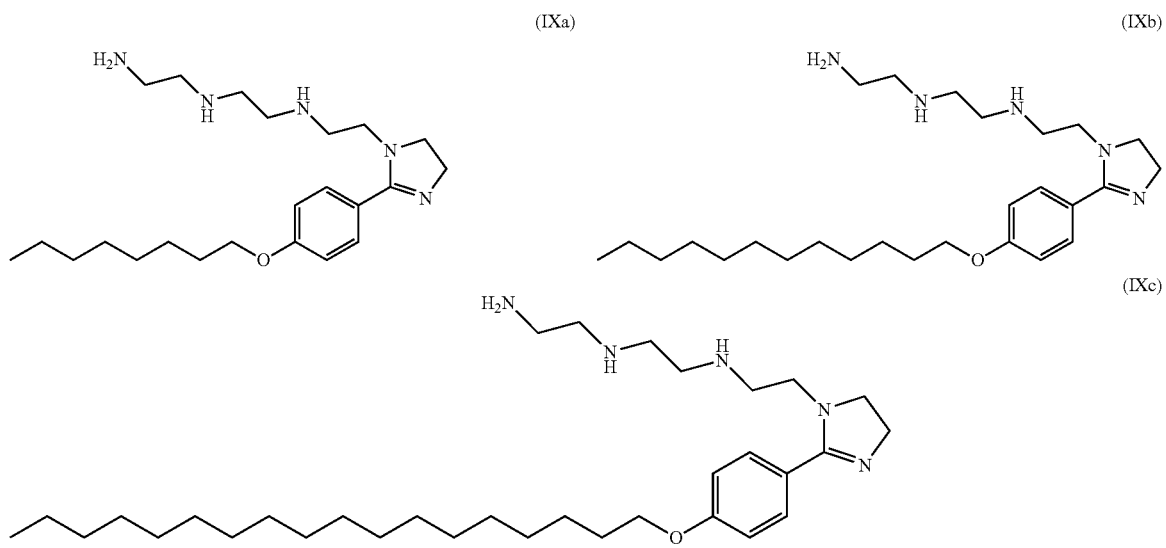

An electron-rich p-alkoxyphenyl substituent at the carbon atom of the N═C—N group augments the electron-donor capacity of the N═C—N group; as such, the effect of increasing electron density of the ring-nitrogens on their inhibition efficacies was examined. The alkoxy groups of $C_8$, $C_{12}$ and $C_{18}$ alkyl chairs were chosen to demonstrate the rich N═C—N groups, along with the aromatic π-clouds, are thought to undergo strong adsorption by the formation of coordinate-type bonds with the empty d-orbitals of Fe on the anodic sites of the metal surface. The highly surface-active imidazolines VIII and IX disclosed herein demonstrated superior corrosion inhibition in a $CO_2$-saturated 0.5 M NaCl, as illustrated in the following tables.

TABLE 1

Results of Tafel plots of a mild steel sample in various solutions containing inhibitors VIIIa-VIIIc in 0.5M NaCl saturated with $CO_2$ at 40° C.

| | | | Tafel plots | | | | |
|---|---|---|---|---|---|---|---|
| Sample | Temp ° C. | Conc. (ppm) | $E_{corr}$ vs. SCE (mV) | $\beta_a$ (mV/dec) | $\beta_C$ (mV/dec) | $i_{corr}$ (μA/cm$^2$) | η (%)[a] |
| Blank[b] | 40 | 0 | −700 | 41.2 | −258 | 103.6 | — |
| VIIIa | 40 | 1 | −694 | 75.2 | −141 | 49.9 | 51.8 |
| | | 5 | −683 | 40.0 | −166 | 38.5 | 62.8 |
| | | 10 | −677 | 44.3 | −172 | 30.9 | 70.1 |
| | | 20 | −671 | 63.9 | −181 | 24.6 | 76.2 |
| | | 50 | −667 | 45.6 | −139 | 17.3 | 83.3 |
| | | 100 | −665 | 36.4 | −123 | 8.32 | 92.0 |
| VIIIb | 40 | 1 | −691 | 25.0 | −113 | 51.1 | 50.7 |
| | | 5 | −674 | 30.9 | −128 | 36.9 | 64.4 |
| | | 10 | −664 | 23.1 | −120 | 26.9 | 74.0 |
| | | 20 | −655 | 28.9 | −136 | 19.7 | 80.9 |
| | | 50 | −646 | 25.4 | −115 | 9.68 | 90.6 |
| | | 100 | −619 | 33.1 | −127 | 7.55 | 92.7 |
| VIIIc | 30 | 0 | −692 | 46.2 | −137 | 93.4 | — |
| | | 1 | −686 | 26.1 | −119 | 43.1 | 53.8 |
| | | 2 | −677 | 33.2 | −148 | 39.1 | 58.1 |
| | | 3 | −663 | 28.8 | −142 | 36.0 | 61.4 |
| | | 5 | −656 | 25.7 | −156 | 26.7 | 71.4 |
| | | 10 | −651 | 41.3 | −149 | 21.6 | 76.8 |
| | | 20 | −630 | 30.8 | −126 | 8.9 | 90.4 |
| | 40 | 1 | −683 | 25.5 | −114 | 43.1 | 58.4 |
| | | 5 | −672 | 34.3 | −117 | 28.3 | 72.7 |
| | | 10 | −659 | 47.1 | −187 | 20.8 | 79.9 |
| | | 20 | −651 | 51.4 | −157 | 8.69 | 91.6 |
| | | 50 | −636 | 39.2 | −148 | 4.81 | 95.4 |
| | | 100 | −620 | 43.8 | −167 | 1.97 | 98.1 |
| | 50 | 0 | −743 | 39.2 | −157 | 124.1 | — |
| | | 1 | −728 | 47.1 | −128 | 65.2 | 47.5 |
| | | 2 | −716 | 38.5 | −146 | 61.1 | 50.7 |
| | | 3 | −700 | 24.8 | −162 | 56.7 | 54.2 |
| | | 5 | −689 | 32.3 | −125 | 39.2 | 68.3 |
| | | 10 | −681 | 29.4 | −149 | 31.6 | 74.5 |
| | | 20 | −663 | 37.7 | −153 | 16.3 | 86.8 |

[a]Inhibition Efficiency, IE (i.e., η) = surface coverage θ.
[b]The blank was a 0.5M NaCl solution saturated with $CO_2$.
[c]Inhibitor sample was dissolve in 0.5 cm$^3$ 2-propanol, and added with 249.5 cm$^3$ blank solution.

TABLE 2

Results of Tafel plots of a mild steel sample in various solutions containing inhibitors IXa-IXc in 0.5M NaCl saturated with $CO_2$ at 40° C.

| | | | Tafel plots | | | | |
|---|---|---|---|---|---|---|---|
| Sample | Temp ° C. | Conc. (ppm) | $E_{corr}$ vs. SCE (mV) | $\beta_a$ (mV/dec) | $\beta_C$ (mV/dec) | $i_{corr}$ (μA/cm$^2$) | η (%)[a] |
| Blank[b] | 40 | 0 | −700 | 41.2 | −258 | 103.6 | — |
| IXa | 40 | 1 | −671 | 61.1 | −249 | 49.2 | 52.5 |
| | | 5 | −660 | 32.4 | −146 | 41.2 | 60.3 |
| | | 10 | −648 | 57.5 | −228 | 29.1 | 71.9 |
| | | 20 | −645 | 35.8 | −183 | 22.5 | 78.2 |
| | | 50 | −641 | 69.2 | −124 | 19.6 | 81.1 |
| | | 100 | −637 | 66.7 | −238 | 9.2 | 91.1 |
| IXb | 40 | 1 | −662 | 38.1 | −204 | 47.2 | 54.4 |
| | | 5 | −643 | 47.2 | −260 | 32.7 | 68.4 |
| | | 10 | −633 | 35.2 | −168 | 26.4 | 74.5 |
| | | 20 | −625 | 56.2 | −154 | 19.5 | 81.2 |
| | | 50 | −609 | 45.9 | −197 | 14.1 | 86.5 |
| | | 100 | −605 | 41.8 | −191 | 6.35 | 93.8 |
| IXc | 30 | 0 | −692 | 46.2 | −137 | 93.4 | — |
| | | 1 | −683 | 29.8 | −125 | 42.8 | 54.1 |
| | | 2 | −674 | 42.7 | −156 | 35.2 | 62.4 |
| | | 3 | −659 | 38.5 | −129 | 28.7 | 69.3 |
| | | 5 | −654 | 42.1 | −148 | 20.0 | 78.5 |
| | | 10 | −633 | 33.0 | −134 | 14.2 | 84.8 |
| | | 20 | −615 | 36.5 | −149 | 4.13 | 95.6 |
| | 40 | 1 | −668 | 54.5 | −235 | 45.3 | 56.3 |
| | | 5 | −657 | 73.1 | −194 | 26.1 | 74.8 |
| | | 10 | −645 | 87.2 | −293 | 20.8 | 79.9 |
| | | 20 | −619 | 34.6 | −148 | 6.91 | 93.3 |
| | | 50 | −598 | 37.6 | −176 | 2.82 | 97.2 |
| | | 100 | −590 | 40.6 | −212 | 1.97 | 98.1 |
| | 50 | 0 | −743 | 39.2 | −157 | 124.1 | — |
| | | 1 | −711 | 52.1 | −153 | 62.6 | 49.5 |
| | | 2 | −694 | 39.4 | −139 | 57.8 | 53.4 |
| | | 3 | −671 | 42.6 | −116 | 44.9 | 63.8 |
| | | 5 | −660 | 29.3 | −152 | 36.2 | 70.8 |
| | | 10 | −638 | 38.0 | −134 | 28.6 | 76.9 |
| | | 20 | −626 | 31.9 | −148 | 11.4 | 90.7 |

[a]Inhibition Efficiency, IE (i.e., η) = surface coverage θ.
[b]The blank was a 0.5M NaCl solution saturated with $CO_2$.
[c]Inhibitor sample was dissolve in 0.5 cm$^3$ 2-propanol, and added with 249.5 cm$^3$ blank solution.

The LPR study revealed θ% values of 73.6, 76.9, and 88.9 at a concentration of 20 ppm of the DETA-derived imidazolines VIIIa, VIIIb, and VIIIc respectively (Table 3).

TABLE 3

Results of LPR method in 0.5M NaCl saturated with $CO_2$ at 40° C.

| | | | | Polarization resistance | |
|---|---|---|---|---|---|
| Sample | Temp ° C. | Concentration (ppm by weight) | $R'_p$ (Ω cm$^2$) | θ[a] | θ (%) |
| Blank[b] | 40 | 0 | 89.7 | — | — |
| VIIIa | 40 | 1 | 218 | 0.589 | 58.9 |
| | | 5 | 247 | 0.637 | 63.7 |
| | | 10 | 276 | 0.675 | 67.5 |
| | | 20 | 340 | 0.736 | 73.6 |
| | | 50 | 568 | 0.842 | 84.2 |
| | | 100 | 973 | 0.908 | 90.8 |
| VIIIb | 40 | 1 | 194 | 0.538 | 53.8 |
| | | 5 | 290 | 0.691 | 69.1 |
| | | 10 | 315 | 0.715 | 71.5 |
| | | 20 | 388 | 0.769 | 76.9 |
| | | 50 | 653 | 0.863 | 86.3 |
| | | 100 | 1059 | 0.915 | 91.5 |
| VIIIc | 30 | 0 | 82.3 | — | — |
| | | 1 | 165 | 0.502 | 50.2 |
| | | 2 | 192 | 0.572 | 57.2 |
| | | 3 | 226 | 0.635 | 63.5 |
| | | 5 | 301 | 0.726 | 72.6 |
| | | 10 | 471 | 0.825 | 82.5 |
| | | 20 | 1107 | 0.925 | 92.5 |
| | 40 | 1 | 210 | 0.573 | 57.3 |
| | | 5 | 305 | 0.706 | 70.6 |
| | | 10 | 477 | 0.812 | 81.2 |
| | | 20 | 809 | 0.889 | 88.9 |
| | | 50 | 1317 | 0.932 | 93.2 |
| | | 100 | 1800 | 0.950 | 95.0 |
| | 50 | 0 | 97.8 | — | — |
| | | 1 | 172 | 0.431 | 43.1 |
| | | 2 | 196 | 0.500 | 50.0 |
| | | 3 | 218 | 0.552 | 55.2 |
| | | 5 | 297 | 0.671 | 67.1 |
| | | 10 | 451 | 0.783 | 78.3 |
| | | 20 | 689 | 0.858 | 85.8 |

[a]Surface coverage, θ = Inhibition Efficiency, IE (i.e., η).
[b]0.5M NaCl solution saturated with $CO_2$.

For the corresponding TEPA-derived imidazolines IXa, IXb and IXc, the respective θ% at 20 ppm were found to be 74.7, 82.4, and 91.2 (Table 4).

TABLE 4

Results of LPR method in 0.5M NaCl saturated with $CO_2$ at 40° C.

| Sample | Temp ° C. | Concentration (ppm by weight) | Polarization resistance $R'_p$ ($\Omega$ cm$^2$) | $\theta^a$ | θ (%) |
|---|---|---|---|---|---|
| Blank[b] | 40 | 0 | 89.7 | — | — |
| IXa | 40 | 1 | 162 | 0.446 | 44.6 |
|  |  | 5 | 214 | 0.581 | 58.1 |
|  |  | 10 | 281 | 0.681 | 68.1 |
|  |  | 20 | 355 | 0.747 | 74.7 |
|  |  | 50 | 515 | 0.826 | 82.6 |
|  |  | 100 | 918 | 0.902 | 90.2 |
| IXb | 40 | 1 | 212 | 0.577 | 57.7 |
|  |  | 5 | 260 | 0.655 | 65.5 |
|  |  | 10 | 332 | 0.730 | 73.0 |
|  |  | 20 | 509 | 0.824 | 82.4 |
|  |  | 50 | 540 | 0.834 | 83.4 |
|  |  | 100 | 1181 | 0.924 | 92.4 |
| IXc | 30 | 0 | 82.3 | — | — |
|  |  | 1 | 169 | 0.514 | 51.4 |
|  |  | 2 | 213 | 0.613 | 61.3 |
|  |  | 3 | 256 | 0.678 | 67.8 |
|  |  | 5 | 336 | 0.755 | 75.5 |
|  |  | 10 | 592 | 0.861 | 86.1 |
|  |  | 20 | 2562 | 0.968 | 96.8 |
|  | 40 | 1 | 176 | 0.493 | 49.3 |
|  |  | 5 | 386 | 0.768 | 76.8 |
|  |  | 10 | 616 | 0.854 | 85.4 |
|  |  | 20 | 1019 | 0.912 | 91.2 |
|  |  | 50 | 1695 | 0.947 | 94.7 |
|  |  | 100 | 2045 | 0.956 | 95.6 |
|  | 50 | 0 | 97.8 | — | — |
|  |  | 1 | 197 | 0.504 | 50.4 |
|  |  | 2 | 225 | 0.565 | 56.5 |
|  |  | 3 | 274 | 0.643 | 64.3 |
|  |  | 5 | 313 | 0.687 | 68.7 |
|  |  | 10 | 546 | 0.821 | 82.1 |
|  |  | 20 | 902 | 0.892 | 89.2 |

[a]Surface coverage, θ = Inhibition Efficiency, IE (i.e., η).
[b]0.5M NaCl solution saturated with $CO_2$.

At various concentrations of the inhibitors, the pentamine derivatives IX imparted slightly better inhibition efficiencies than their triamine counterparts VIII. Note that a concentration of 20 ppm of VIIIa, VIIIb, VIIIc and IXa, IXb, IXc translates into their respective concentrations of 63.0, 53.5, 43.7, 49.6, 43.5, and 36.8 μM respectively.

A higher polyamine chain length seems to augment the corrosion inhibition to a limited extent. Both VIIIc and IXc having a hydrophobic alkyl chain of $C_{18}$ show better inhibition efficacies than their respective $C_8$ or $C_{12}$ counterparts VIIIa, IXa, and VIIIb, IXb. An increase in the θ% values with an increasing alkyl chain length may be attributed to the extra coverage of the metal surface made possible by the longer hydrophobic tails. The results of the Tafel extrapolations (Tables 1 and 2) corroborated the findings of the LPR method (Tables 3 and 4). As evident from Table 5, at a concentration of 100 ppm, all the imidazolines imparte very good IEs, especially VIIIc and IXc, where both have a η% of over 98.

TABLE 5

Corrosion inhibition efficiency, η (%) using polarization resistance and Tafel plots of mild steel samples in various solutions containing 50 and 100 ppm by weight of the inhibitors in 0.5M NaCl solution saturated with $CO_2$ (1 atm) at 40° C.

| | η (%) | | | | | |
|---|---|---|---|---|---|---|
| | Polarization method | | | Tafel method | | |
| Compound | 20[a] | 50[a] | 100[a] | 20[a] | 50[a] | 100[a] |
| VIIIa | 73.6 | 84.2 | 90.8 | 76.2 | 83.3 | 92.0 |
| VIIIb | 76.9 | 86.3 | 91.5 | 80.9 | 90.6 | 92.7 |
| VIIIc | 88.9 | 93.2 | 95.0 | 91.6 | 95.4 | 98.1 |
| IXa | 74.7 | 82.6 | 90.2 | 78.2 | 81.1 | 91.1 |
| IXb | 82.4 | 83.4 | 92.4 | 81.2 | 86.5 | 93.8 |
| IXc | 91.2 | 94.7 | 95.6 | 93.3 | 97.2 | 98.1 |

[a]inhibitor concentration in ppm by weight

Referring now to FIGS. 5A, 5B, 5C, and 5D which shows the Tafel plots for the imidazolines and their Tafel constants, while corrosion potentials and IEs are included in Tables 1 and 2. The $E_{corr}$ values in all the cases progressively shifted to less negative values (i.e. noble direction) with the increase in the inhibitor concentrations, thereby indicating that the imidazolines are suppressing mainly the anodic reactions as illustrated in FIGS. 5A, 5B, 5C, and 5D. A difference of $E_{corr}$ values between the blank and inhibited solution (100 ppm) in the ranges 35-72 mV (Table 1) and 57-78 mV (Table 2) for (VIIIa, VIIIb, VIIIc) and (IXa, IXb, IXc), respectively, does not qualify these inhibitors to be classified under anodic type inhibitors. Classification of a compound as a cathodic- or anodic-type inhibitor is feasible when the $E_{corr}$ is shifted by at least 85 mV [S. Z. Dunn, Y. L. Tao, Interface Chemistry. Higher Education Press, Beijing, 1990, pp. 124-126. Incorporated herein by reference in its entirety]. Inhibitor action is more pronounced in the anodic Tafel lines as the difference between the anodic current densities in the absence and presence of inhibitor are much greater than the corresponding differences in the cathodic branches as shown in FIGS. 5A, 5B, 5C, and 5D. The inhibitors thus retard the anodic dissolution of iron more than the cathodic hydrogen evolution reaction. As evident from Tables 1 and 2, the cathodic ($\beta_c$) and anodic ($\beta_a$) slopes in most instances are not greatly affected, thereby implying that the mechanism of the reactions occurring at the electrodes are not altered in the presence of the inhibitors. The inhibitors simply block the anodic and cathodic reaction sites. The $E_{corr}$ shifts suggest that the studied compounds in $CO_2$ saturated 0.5 M solution act as mixed-type inhibitors under the predominance of anodic control. FIGS. 5A, 5B, 5C, and 5D shows that the shift in the anodic direction increases in the order: VIIIa<VIIIb<VIIIc and IXa<IXb<IXc, and the shift in the presence of a pentanamine-derived inhibitor (IX) were found to be slightly higher than those of a triamine-derived imidazolines (VIII). The negative values of $\Delta H°_{ads}$ suggest an exothermic physisorption of the inhibitors on the metal surface, while negative $\Delta G°_{ads}$ certify their favorability as illustrated in Table 6. [S. Nesic, G. T. Solvi, J. Enerhaug, Comparison of the rotating cylinder and pipe flow tests for flow-sensitive carbon dioxide corrosion, Corrosion 10 (1995) 51773-787. Incorporated herein in its entirety.] The relatively smaller values of $-\Delta G°_{ads}$ values in the range 37-43 kJ/mol, which are greater than 20 kJ/mol, indicate the electrostatic (i.e. physisorption) and chemisorption adsorption mechanism of the imidazolines on mild steel [W. Durnie, R. De Marco, A. Jefferson, B. Kinsella, Development of a structure-activity relationship for oil field corrosion inhibitors, J. Electrochem. Soc. 146 (1999) 1751-1756. S. Z. Duan, Y. L. Tao, Interface Chemistry. Higher Education Press, Beijing, 1990, pp. 124-126. Incorporated herein by reference in its entirety].

A protective film can be constructed by the formation of at least one 'coordinate type' chemical bond between d-orbitals of iron and the non-bonding, as well as the π-electrons, in the electron-rich imidazoline group and the aromatic ring. [F. Bentiss, M. Triasnel, M. Lagrenee, The substituted 1,3,4-oxadiazoles: a new class of corrosion inhibitors of mild steel in acidic media. Corros. Sci., 42 (2000) 127-146 S. Kertit, B. Hammouti, Corrosion inhibition of iron in 1 M HCl by 1-phenyl-5-mercapto-1,2,3,4-tetrazole. Appl. Surf. Sci., 93 (1996) 59-66. Incorporated herein by reference in their entirety].

Moderately positive values for the entropy change, $\Delta S°_{ads}$, ascertain the favorable increase in randomness as a result of the displacement of water molecules from the metal surface as shown in Table 6. As the temperature increases, the $E_{corr}$ becomes more negative (less noble), which makes the metal surface more susceptible to media attack.

TABLE 6

The values of the adsorption equilibrium constant from Langmuir adsorption isotherms and free energy, enthalpy, entropy changes of the mild steel dissolution in the presence of inhibitors VIII and IX in $CO_2$ saturated 0.5M NaCl at various temperatures.

| Compound | Temp (° C.) | $K_{ads} \times 10^{-5}$ (L mol$^{-1}$)$^a$ | $\Delta G°_{ads}$ (kJ mol$^{-1}$) | $\Delta H°_{ads}$ (kJ mol$^{-1}$) | $\Delta S°_{ads}$ (J mol$^{-1}$ K$^{-1}$) |
|---|---|---|---|---|---|
| VIIIa | 40 | 27083 | −37.0 | — | — |
| VIIIb | 40 | 34995 | −37.7 | — | — |
| VIIIc | 30 | 191106 | −40.8 | −15.8 | +82.5 |
|  | 40 | 163330 | −41.7 |  |  |
|  | 50 | 129573 | −42.4 |  |  |
| IXa | 40 | 32676 | −37.5 | — | — |
| IXb | 40 | 81241 | −39.9 | — | — |
| IXc | 30 | 310441 | −42.0 |  |  |
|  | 40 | 266094 | −43.0 | −16.3 | +85.0 |
|  | 50 | 210417 | −43.7 |  |  |

$^a K_{ads}$ obtained in L/mg was converted to L/mol

Some of the anodic polarization curves in the current-vs-potential plots, especially in the higher concentration range of the inhibitors, have a current-increasing plateau which is called the desorption potentials. [F. Bentiss, M. Triasnel, M. Lagrenee, The substituted 1,3,4-oxadiazoles: a new class of corrosion inhibitors of mild steel in acidic media. Corros. Sci., 42 (2000) 127-146 W. Jia, A study on the impedance responses of inhibitor desorption, Chin. J. Oceanol. Limnol. 16 (1998) 54-59. Incorporated herein by reference in their entirety.] This is displayed in FIGS. 5A, 5B, 5C, and 5D. Significant steel dissolution occurs at potentials higher than the respective desorption potential, thereby suggesting a mechanism by which the inhibitors block the anodic sites on the metal surface. The surface coverage data (θ) indicate that the adsorption of the imidazolines are fitted best by the Langmuir adsorption isotherm; while some of them followed Temkin as well as Freundlich adsorption isotherms (Table 7).

TABLE 7

Square of coefficient of correlation ($R^2$) and values of the constants in the adsorption isotherms of Temkin, Frumkin, Langmuir and Freundlich in the presence of inhibitors VIII and IX in $CO_2$ Saturated 0.5M NaCl solution (LPR data used for the isotherm).

| Compound | Temp (° C.) | Temkin ($R^2$, f) | Langmuir ($R^2$) | Frumkin ($R^2$, a) | Freundlich ($R^2$) |
|---|---|---|---|---|---|
| VIIIa | 40 | 0.9260, 14 | 0.9984 | 0.7313, −3.5 | 0.9503 |
| VIIIb | 40 | 0.9912, 12 | 0.9956 | 0.9387, −3.2 | 0.9843 |
| VIIIc | 30 | 0.9901, 6.9 | 0.9992 | 0.8389, −1.1 | 0.9952 |
|  | 40 | 0.9831, 9.4 | 0.9971 | 0.8128, −1.9 | 0.9929 |
|  | 50 | 0.9848, 6.6 | 0.9940 | 0.8105, −0.85 | 0.9822 |
| IXa | 40 | 0.9954, 10 | 0.9919 | 0.9542, −2.4 | 0.9864 |
| IXb | 40 | 0.9338, 13 | 0.9936 | 0.7907, −3.4 | 0.9573 |
| IXc | 30 | 0.9997, 6.6 | 0.9972 | 0.8551, −0.78 | 0.9948 |
|  | 40 | 0.9808, 7.0 | 0.9968 | 0.9961, −0.73 | 0.9591 |
|  | 50 | 0.9874, 7.4 | 0.9967 | 0.7608, −0.99 | 0.9881 |

The relatively higher values of the energetic inhomogeneity factor f obtained from the Temkin model signifies a strong dependence of the free energy of adsorption ($\Delta G°_{ads}$) on the surface coverage. [B. I. Podlovchenko, B. B. Damaskin, Possible demarcation of adsorption isotherms based on repulsive interaction and surface inhomogeneity, Elektrokhimiya 8 (1972) 297. A. E. Stoyanova, E. I. Sokolova, S. N. Raicheva, The inhibition of mild steel corrosion in 1 M HCl in the presence of linear and cyclic thiocarbamides—Effect of concentration and temperature of the corrosion medium on their protective action, Corros. Sci. 39 (1997) 1595-1604. Incorporated herein by reference in their entirety.]

The imidazolines performed very well at higher temperature (120° C.) and pressure 10 bar, $CO_2$) to arrest corrosion in 0.5M NaCl (Table 8).

TABLE 8

Corrosion rates and inhibition efficiencies of various corrosion inhibitors (200 ppm by weight) at 120° C. and 10 bar pressure of $CO_2$ in 0.5M NaCl solution.

| Solution | Coupon$^a$ | $CR^b$ (mm y$^{-1}$) | % Inhibition | Average % Inhibition |
|---|---|---|---|---|
| Blank | A | 2.19 | — | — |
|  | B | 2.23 | — |  |
| VIIIa | A | 0.607 | 72.3 | 71.8 |
|  | B | 0.638 | 71.4 |  |
| VIIIb | A | 0.195 | 91.1 | 90.8 |
|  | B | 0.212 | 90.5 |  |
| VIIIc | A | 0.149 | 93.2 | 93.1 |
|  | B | 0.156 | 93.0 |  |
| IXa | A | 0.569 | 74.0 | 72.5 |
|  | B | 0.647 | 71.0 |  |
| IXb | A | 0.153 | 93.0 | 92.4 |
|  | B | 0.181 | 91.9 |  |
| IXc | A | 0.153 | 93.0 | 93.3 |
|  | B | 0.143 | 93.6 |  |
| Q I 80 | A | 0.429 | 80.4 | 81.0 |
|  | B | 0.410 | 81.6 |  |
| ARMOHIB29 | A | 0.396 | 81.9 | 82.7 |
|  | B | 0.368 | 83.5 |  |

$^a$Two mild steel coupons A and B having different carbon content and compositions
$^b$Corrosion rate The inhibition efficacy η% of the imidazolines, as determined using two types of metal coupons A and B having different elemental compositions and carbon content, were found to increase in the following order: VIIIc>VIIIb>VIIIa> and IXc>IXb>IXa. The current imidazolines having $C_{12}$ (VIIIb, IXb) and $C_{18}$ (VIIIc, IXc) alkyl chains, outperformed the two commercial imidazolines QI80 and ARMOHIB219 (Table 8). The objective of constructing a surface tension versus inhibitor concentration profile is to find the imidazoline's CMC which can be used to compare the absorption pattern on either side of the CMC. The imidazolines, when found in an aqueous media, are classified as cationic surfactants because of the involvement of the cationic form B found in equilibrium with its neutral counterpart A (Scheme 1). [D. Bajpai, V. K. Tyagi, Fatty imidazolines: chemistry, synthesis, properties and their industrial application, J. Oleo. Sci. 55 (7) (2006) 319-329. Incorporated herein by reference in its entirety].

In terms of molar concentration, the CMC, well as surface tension of the imidazolines, are found to follow the order if: VIIIa>VIIIb>VIIIc; IXa>IXb>IXc; and VIII>IX (Table 9). In an aqueous 0.5 M NaCl solution the pentamine derivatives IX a-c, having greater hydrophilic polar heads, are expected to have greater CMC values for being more soluble in water as compared to their triamine counterparts. The increase in the hydrophobic alkyl chain length decreases the solubility of the imidazolines, and, as expected, decreases the CMC. [W. Wang, M. L. Free, D. Horsup, Prediction and measurement of corrosion inhibition of mild steel by imidazolines in brine solutions. Metall. Mater. Trans. B, 36 (2005) 335-341. Incorporated herein by reference in its entirety.] The $C_{18}$ alkyl tails, by virtue of having the greater hydrophobic interactions, lead to smaller CMC values for the imidazolines VIIIc and IXc. Imidazoline VIIIa $CO_2$-saturated 0.5 NaCl has a CMC value of 37.4 µM (≈11.9 ppm), whereas in the absence of $CO_2$, it becomes 30.2 µM (≈9.59 ppm). The formation of a carbamate salt of an imidazoline in a $CO_2$-saturated NaCl solution makes it more water-soluble, hence increases the CMC value (vide infra). A closer look at the CMC values FIGS. 8A and 8B and Table 9, and the surface coverage (θ) data FIGS. 8C and 8D, and Tables 3 and 4, reveals that imidazolines cover a majority of the surface before the concentrations reach their CMC values.

TABLE 9

Surface properties of imidazolines VIII and IX in 0.5M NaCl at 40° C.

| Compound | Surface tension (mN m$^{-1}$) | $C_{cmc}$ (µmol L$^{-1}$) | $C_{cmc}$ (ppm) | ΔG°$_{mic}$ (kJ mol$^{-1}$) |
|---|---|---|---|---|
| VIIIa | 33.5 | 30.2 | 9.59 | −27.1 |
| VIIIa$^a$ | 35.0 | 37.4 | 11.9 | −26.5 |
| VIIIb | 31.5 | 21.8 | 8.14 | −27.9 |
| VIIIc | 29.3 | 20.0 | 9.15 | −28.2 |
| IXa | 36.2 | 22.4 | 8.99 | −27.9 |
| IXb | 34.0 | 18.3 | 8.38 | −28.4 |
| IXc | 31.2 | 13.9 | 7.53 | −29.1 |

$^a$0.5M NaCl saturated with $CO_2$

An adsorption on the metal surface is favored over a micellization since the ΔG°$_{ads}$ values are more negative (Table 6) when compared with the corresponding ΔG°$_{mic}$ (Table 9). The monolayer formation at the interface between the metal and solution is complete before the CMC; after which multilayer coverage, as a result of adsorption of the micelles, may impart further protection albeit to a lesser degree. [4 K. Esumi, M. Ueno, Structure Performance Relationships in Surfactants. Marcel Dekker Press, 2001. Incorporated herein by reference in its entirety.]

The XPS survey scan composition of Fe immersed in an inhibited solution of 0.5 M NaCl—$CO_2$ revealed the presence of a carbonaceous film at the metal surface as indicated by its high carbon and small Fe contents (Table 10).

TABLE 10

XPS survey scan composition of Fe immersed in inhibited solution of 0.5M NaCl - $CO_2$ (1 atm) at 40° C. for 4 h.

| Peak | Approx. binding energy (eV) | Composition (atom %) | | | | | |
|---|---|---|---|---|---|---|---|
| | | 8a | 8b | 8c | 9a | 9b | 9c |
| C 1s | 285.4 | 24.6 | 30.8 | 34.9 | 28.7 | 45.0 | 32.3 |
| C 1s | 286.4 | 37.8 | 32.7 | 24.8 | 22.8 | 19.1 | 24.3 |
| O 1s | 530.1 | 9.0 | 9.0 | 4.0 | 11.5 | 4.5 | 11.5 |
| O 1s | 531.5 | | | 26.5 | 14.4 | 1.6 | 5.7 |
| O 1s | 532.9 | 19.4 | 19.2 | | 1.2 | 23 | 16.9 |
| O1s | 534.4 | 9.5 | | | | 11.4 | |
| N 1s | 400.0 | | 4.7 | 5.2 | 5.0 | | |
| N 1s | 400.6 | 3.3 | 1.1 | | | 4.4 | 5.5 |
| Fe 2p | 706.3 | | 0.2 | | | 0.4 | |
| Fe 2p | 711.0 | 1.4 | 1.9 | 2.3 | 4.2 | 1.5 | 3.3 |
| Fe 2p | 714.3 | 0.78 | 0.4 | 0.6 | 0.8 | 0.5 | 0.5 |
| Cl 2p | 197.55 | 0.92 | | 1.7 | | | |
| | 199.19 | | | | | | |

Figure 9A:
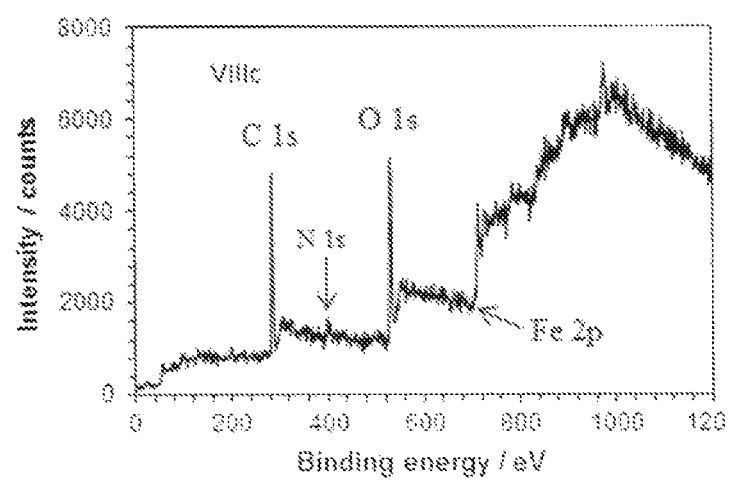
FIG. 9A shows an XPS spectrum of Fe after immersing in $CO_2$ saturated 0.5 M NaCl at 40° C. for 6 h in the presence of VIIIc (100 ppm)
Figure 9B:
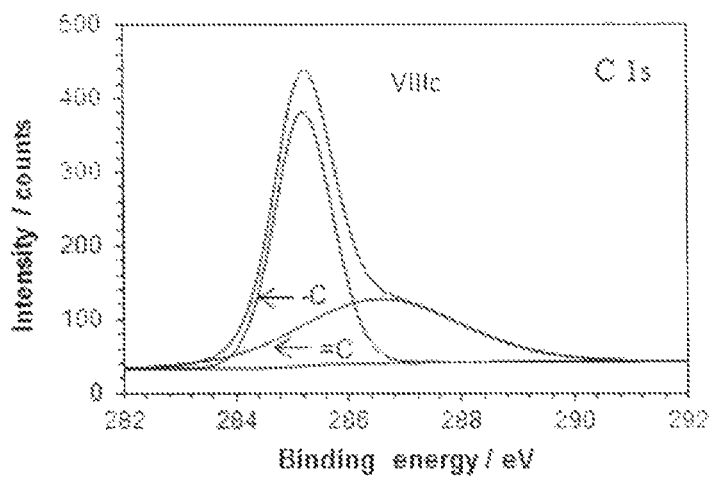
FIG. 9B shows an XPS deconvoluted profile of C 1 s after immersing in $CO_2$ saturated 0.5 M NaCl at 40° C. for 6 in the presence VIIIc (100 ppm)
Figure 9C:
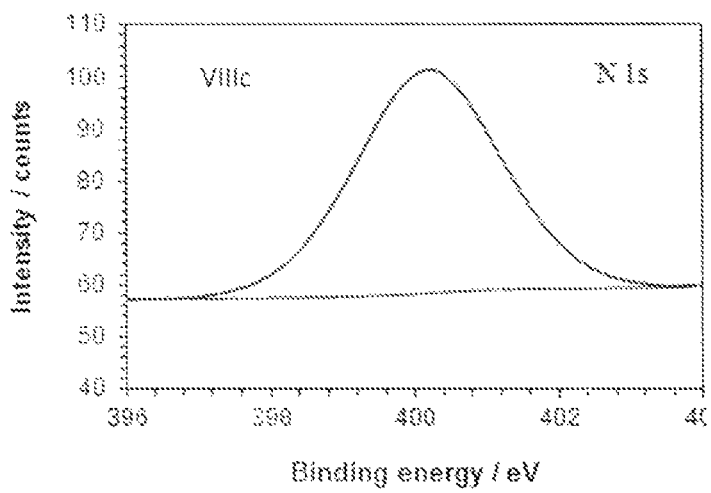
FIG. 9C shows an XPS deconvoluted profile of N 1 s after immersing in $CO_2$ saturated 0.5 M NaCl at 40° C. for 6 h in the presence of VIIIc (100 ppm)
Figure 9D:
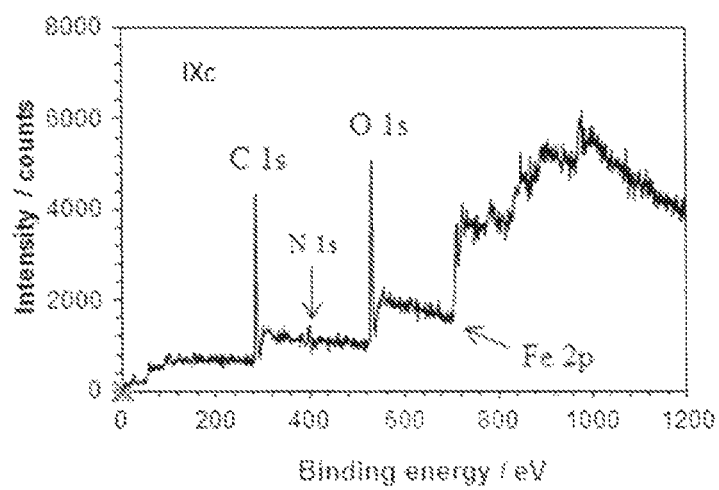
FIG. 9D shows an XPS spectrum of Fe in the presence of IXc.
Figure 9E:
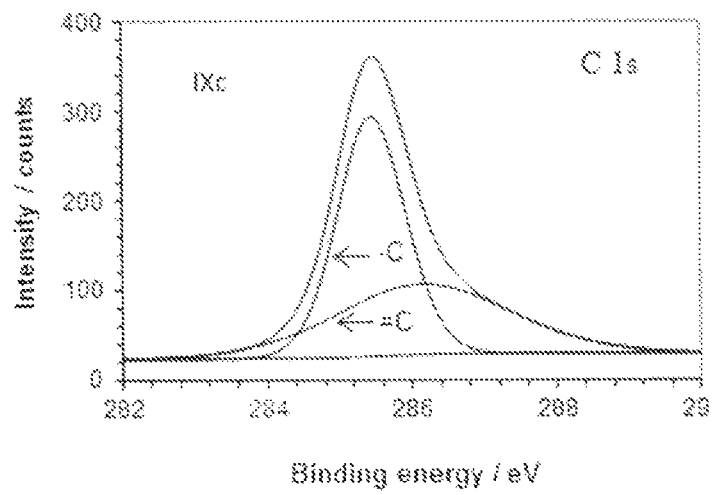
FIG. 9E shows an XPS deconvoluted profile of C 1 s in the presence of IXc.
Figure 9F:
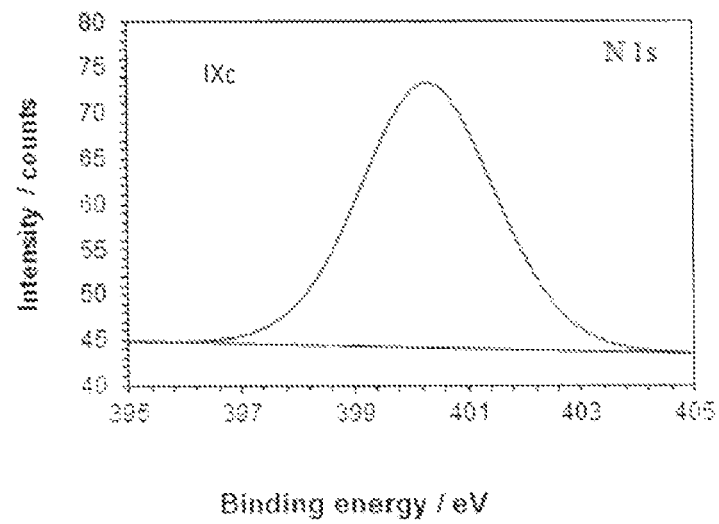
FIG. 9F shows an XPS deconvoluted profile of N 1 s in the presence of IXc.
Figure 10A:
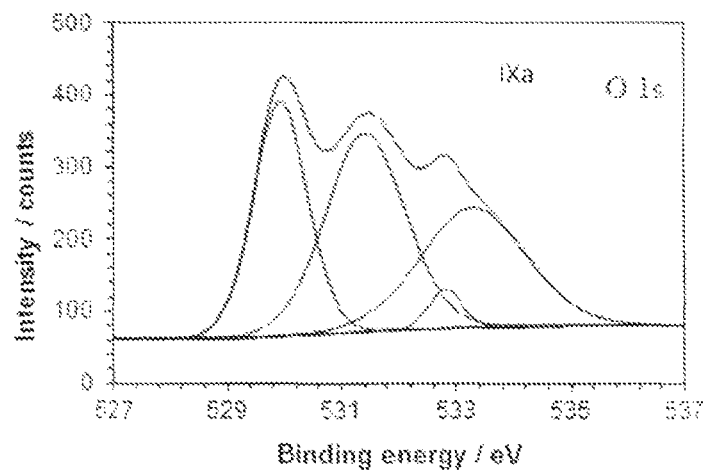
FIG. 10A shows an XPS deconvoluted profile of O 1 s in the presence of 100 ppm of IXa.

The presence of N (Nitrogen) points (FIGS. 9C, 9F, 10C) its origin to the imidazolines: the metal surface is thus covered by a film of imidazolines. The XPS spectra, for example, in the presence of inhibitors VIIIc and IXc, are shown in FIG. 9A and FIG. 9D, respectively.

Figure 10B:
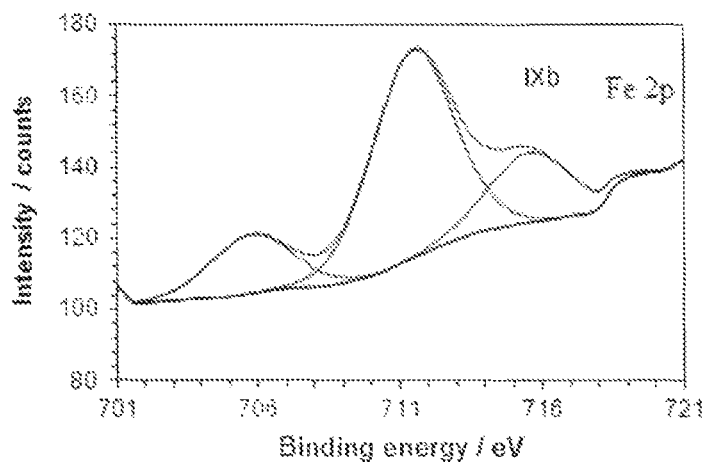
FIG. 10B shows an XPS deconvoluted profile of Fe 2 p in the presence of 100 ppm of IXb.
Figure 10C:
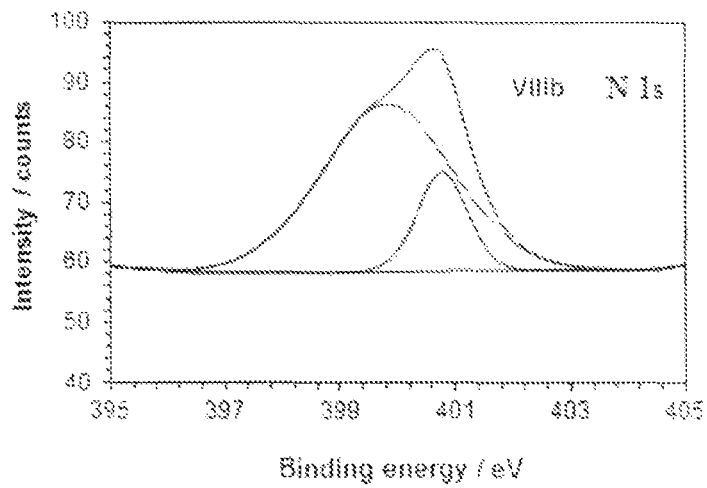
FIG. 10C shows an XPS deconvoluted profile of N 1 s in the presence VIIIb (100 ppm) after immersing Fe in $CO_2$ saturated 0.5 M NaCl at 40° C. for 6 h.

The XPS deconvoluted profiles of a C 1 s spectrum for VIIIc and IXc revealed a two-peak profile (FIGS. 9B and 9E); the peak at 285.4 eV was assigned to the C—C aliphatic bonds, while the presence of C=C, C=O, and C—N bonds were reflected by the peak at 286.4 eV. The presence of O 1 s peaks at 530.1 and 531.5 eV is attributed to the $O^{2-}$ in $Fe_2O_3$ and hydrous iron oxide FeOOH, respectively (FIG. 10A), [O. Olivares-Xometl, N. V. Likhanova, M. A. Dominguez-Aguilar, J. M. Hallen, L. S. Zamudio, E. Arce, Surface analysis of inhibitor films formed by imidazolines and amides on mild steel in an acidic environment, Appl. Surf. Sci. 252 (2006) 2139-2152. M. Tourabi, K. Nohair, M. Traisnel, C. Jama, F. Bentiss, Electrochemical and XPS studies of the corrosion inhibition of carbon steel in hydrochloric acid pickling solutions by 3,5-bis(2-thienylmethyl)-4-amino-1,2,4-triazole, Corros. Sci. 75 (2013) 123-133. Incorporated herein by reference in their entirety.] The other O 1 s peaks at 532.9 and 534.3 may be associated with the oxygen of adsorbed water. Small intensity peaks at 711 and 706.3 are indicative of the presence of $Fe^{3+}$ (2 p) and $Fe^0$ (2p) (FIG. 10B). The peak located around 714.3 is indicative of the presence of a small concentration of $FeCl_3$.

Imidazolines VIIIb and IXb, as shown in Scheme 3, both have hydrophobe lengths equivalent to 17 CC bonds. At concentrations of 1, 5 and 10 ppm, they are found to impart better corrosion protection than their corresponding imidazolines having heptadecyl ($C_{17}$) alkyl chains X and XI, respectively.

Scheme 3: The comparison of Imidazolines 8a and 9b with imidazolines having heptadecyl ($C_{17}$) alkyl chanins.

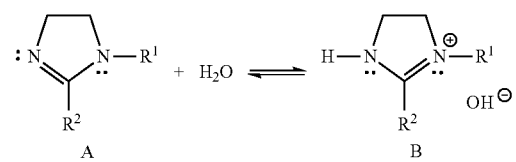

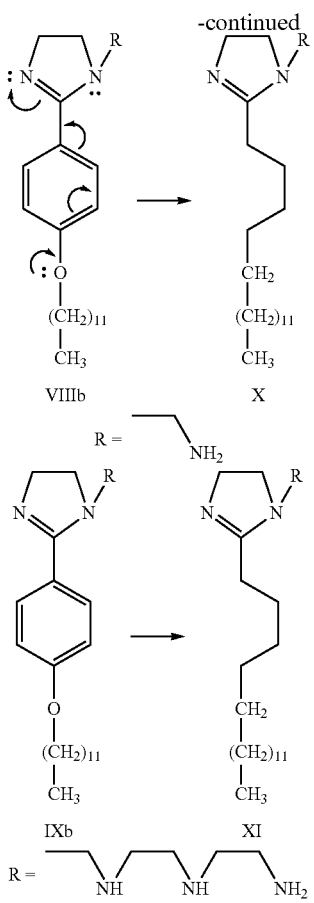

Results of the comparative inhibition behaviors of imidazolines having similar pendent chain length 8b versus 10 and 9b versus 11 are shown in Table 11 below.

The length of the benzene ring is considered an equivalent to four CC bonds and O is assumed to be an equivalent of C. Aminoalkyl imidazolines VIIIc and IXc, having hydrophobes equivalent to 23 CC bonds, achieved superior results when compared with imidazolines VIIIa,b and IXa,b of this disclosure (Tables 3-5).

Figure 11A:
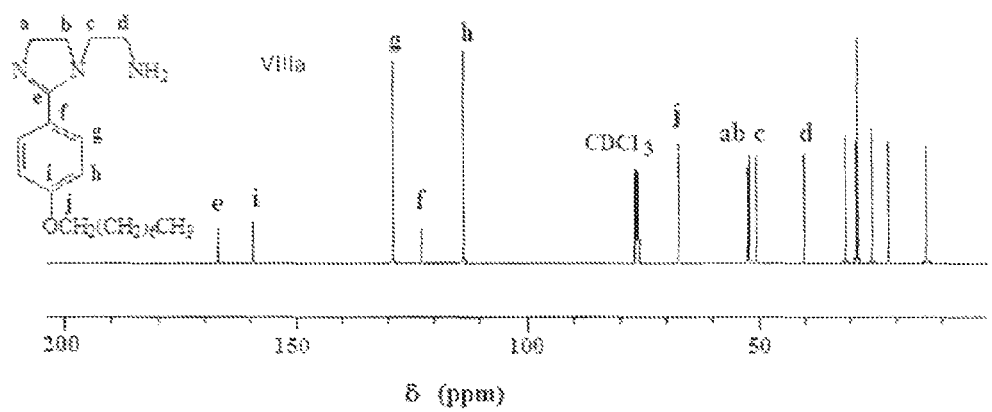
FIG. 11A shows a $^{13}C$ NMR spectra of VIIIa (in $CDCl_3$, using TMS as internal standard)

A study to determine the chemical behavior of the imidazolines in aqueous $CO_2$ was performed. An initial $^{13}C$ NMR spectra of VIIIa in $CDCl_3$ using TMS as an internal standard is shown in FIG. 11A. Subsequently, the chemical behavior of the imidazolines in aqueous $CO_2$ was investigated using the following procedure: $CO_2$ was passed through a mixture of VIIIa (65 mg) in $D_2O$ (0.8 cm$^3$) at 40° C. for 5 min. The $^{13}C$ NMR spectrum revealed the presence of four signals at the chemical shifts of 161.0, 163.0, 164.4 and 167.3 ppm, assigned to the carbons marked as $HCO_3^-$, i, k, and e, respectively in FIG. 11B. The assignment of $HCO_3^-$ was based on literature [D. J. Heldebrant, P. G. Jessop, C. A. Thomas, C. A. Eckert, C. L. Liotta, The Reaction of 1,8-Diazabicyclo[5.4.0]undec-7-ene (DBU) with carbon dioxide, J. Org. Chem. 70 (2005), 5335-5338. Incorporated herein by reference in its entirety]. The presence of carbon marked 'k' signal at 164.4 ppm was assigned to the carbamate group [NHC(=O)O$^-$]; the absence of any signal at ≈174 ppm precluded the presence of amide group [NHC(=O)C—] which would have been generated by hydrolysis of the imidazoline groups. [Y. Duda, R. G. Rueda, M. Galicia, H. I. Beltran, L. S. Z. Rivera, Corrosion inhibitors: Design, performance, and computer simulations. J. Phys. Chem. B, 109 (2005) 22674-22684. Incorporated herein by reference in its entirety.] The reaction in the presence of $CO_2$ is presented in Scheme 4.

Scheme 4: Reaction of Imidazolines in the presence of $CO_2$

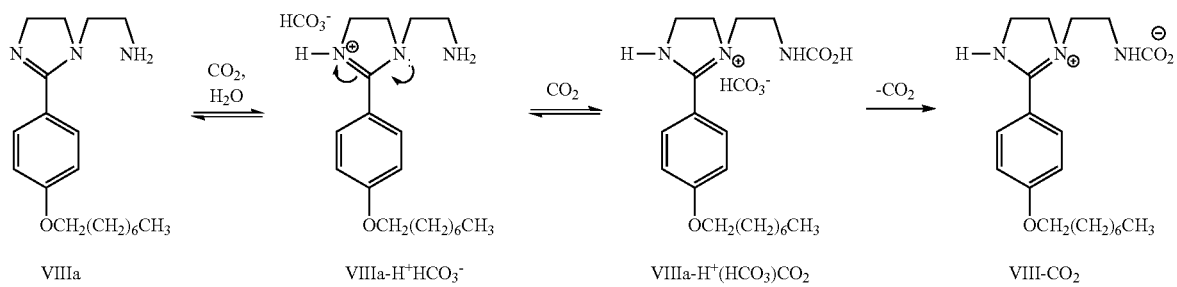

TABLE 11

| Imidazoline | η % at concentration (ppm) of | | | | |
| --- | --- | --- | --- | --- | --- |
| | 1 | 5 | 10 | 20 | 50 |
| VIIIb | 53.8 | 69.1 | 71.5 | 76.9 | 86.3 |
| X | 23.1 | 54.0 | 64.7 | — | 84.5 |
| IXb | 57.7 | 65.5 | 73.0 | 82.4 | 83.4 |
| XI | <14.3 | <49.9 | 65.4 | 87.2 | 90.2 |

Figure 11B:
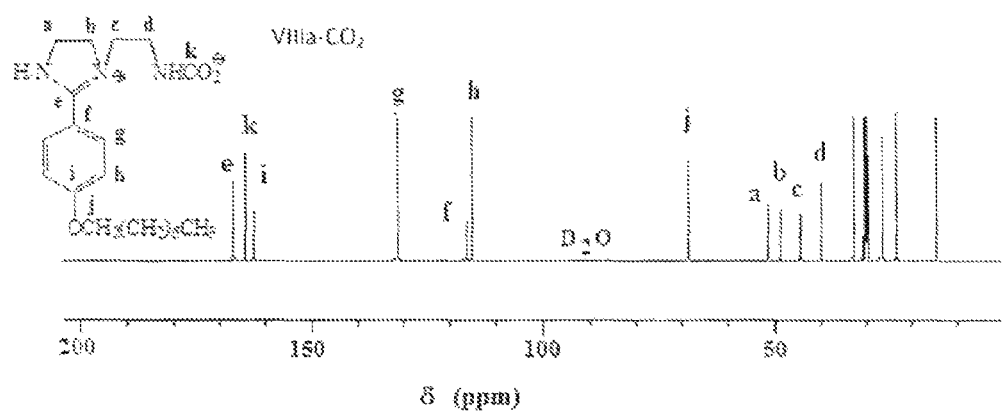
FIG. 11B shows a $^{13}C$ NMR spectra of VIIIa-$CO_2$ (in $D_2O$ using dioxin as an external standard) and FIG. 11C shows a $^{13}C$ NMR spectra of VIIIa-$H^+(HCO_3^-)CO_2$ (in $D_2O$ using dioxin as an external standard).
Figure 11C:
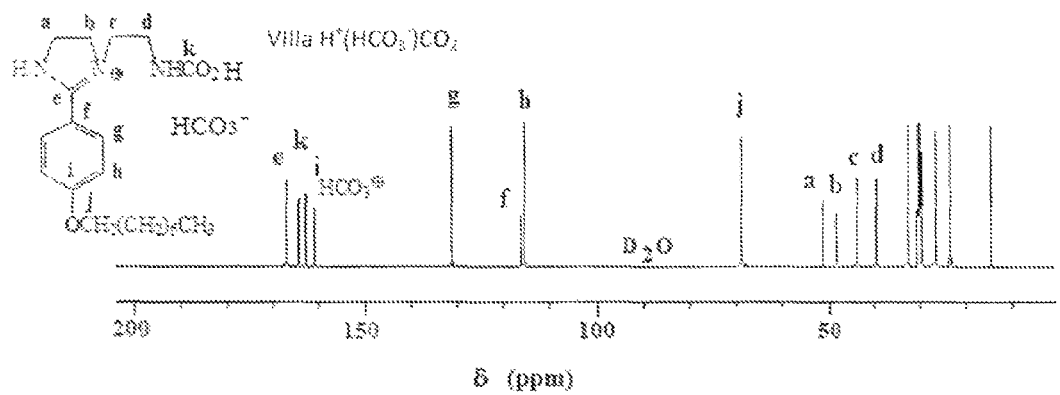

Imidazoline VIIIa is expected to give rise to the bicarbonate salt VIIIa-H$^+$ HCO$_3^-$ as a result of protonation of the amidine motif; the reaction of the primary amine group (NH$_2$) would furthermore lead to the formation of carbamic acid. [P. N. Sutar, A. Jha, P. D. Vaidya, E. Y. Kenig, Secondary amines for $CO_2$ capture: A kinetic investigation using N-ethylmonoethanolamine, Chem. Eng. J. 207-208 (2012) 718-724. Incorporated herein by reference in its entirety.] In a similar experiment carried out in $H_2O$, the residue was subsequently vacuum dried after being treated with flowing $CO_2$, followed by removal of the solvent, at room temperature. The IR spectrum of the residue revealed the absence of any peak around 1640 cm$^{-1}$ thereby asserting that the hydrolysis of the amidine group to an amide group did not occur; the presence of a peak at 1610 cm$^{-1}$ indicated the presence of a protonated amidine [C=N—H$^+$] W. Qiao, Z. Zheng, Q. Shi, Synthesis and properties of a series of CO2 switchable surfactants with imidazoline group, J. Surfact. Deterg. 15 (2012) 533-539. Incorporated herein by reference in its entirety.] The $^{13}$C NMR spectrum of the residue revealed the absence of a HCO$_3^-$ carbon signal; however, it indicated the presence of three carbon signals at 162.5, 164.3 and 167.2 ppm which are attributed to the carbons marked i, k and e, respectively, of VIIIa-CO$_2$ as shown in FIG. 11B. The spectral analyses thus confirmed the formation of bicarbonate salt VIIIa, followed by bicarbonate/carbamic acid VIIIa-H$^+$(HCO$_3^-$)CO$_2$, (shown in FIG. 11C) in aqueous solution. However, in the absence of water, carbonic acid was lost in the form of CO$_2$/H$_2$O to give the zwitterionic carbamate VIIIa-CO$_2$, as indicated in FIG. 11B.

The study details the chemical reactions of imidazoline in aqueous CO$_2$, and confirms the effectiveness of corrosion inhibitors bearing electron-rich amidine groups.

The compounds acted mainly as anodic inhibitors, with $\Delta G°_{ads}$ values indicative of chemisorption and XPS results ascertained the formation of an adsorbed protective film in CO$_2$-saturated 0.5 M NaCl. The adsorption process of the imidazolines was found to obey the Langmuir adsorption isotherm. The surface coverage data and CMC values demonstrated that the inhibitor molecules have a greater tendency to undergo adsorption on to the metal surface than to form micelles. In autoclave tests under high CO$_2$ pressure (10 bar) and a temperature of 120° C. the imidazolines VIII b, c and IX b, c all performed superior in corrosion inhibition as compared to Q180-E and ARMOHIB 219, two commercial inhibitors tested for this purpose. These findings, as disclosed herein, confirm the function of said imidazolines incorporating electron-rich aromatic group in conjugation to the N=C—N groups.

The present disclosure relates to imidazoline compounds, a method of forming said compounds, and their use in preventing, inhibiting, corrosion.

The examples below are intended to further illustrate protocols for preparing and characterizing the various embodiments of imidazoline compounds described herein, and are not intended to limit the scope of the claims Example 1

Materials

Diethylenetetramine (DETA) (99.5%) and tetraethylenepentamine (TEPA) (~60% purity) were obtained from Aldrich Chemicals. TEPA was purified as described before [M. W. S. Jawich, G. A. Oweimreen, S. A. Ali, Heptadecyl-tailed mono- and bis-imidazolines: A study of the newly synthesized compounds on the inhibition of mild steel corrosion in a carbon dioxide-saturated saline medium, Corros. Sci. 65 (2012) 104-112. Incorporated herein by reference in its entirety.] p-Hydroxybenzoic acid (I), cysteine hydrochloride, bromoalkane [R—Br (II)] and SOCl$_2$ from Fluka Ag (Buchs, Switzerland) were used as received. All solvents were of reagent grade.

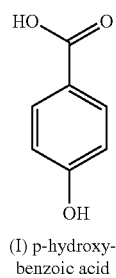

(I) p-hydroxybenzoic acid

Physical Methods

All m.p.s are uncorrected. IR spectra were recorded on a Perkin Elmer 16F PC FTIR spectrometer and 1H and $^{13}$C NMR spectra were measured in CDCl$_3$ using TMS as internal standard on a JEOL LA 500 MHz NMR spectrometer. Elemental compositions were determined with an Elemental Analyzer (Carlo-Erba: Model 1106). All the reactions were carried out under N$_2$.

Synthesis

General Procedure for the Preparation of Alkyloxybenzoic Acids (III)

Powdered NaOH (40×2.10 mmol) followed by bromoalkane 2 (40×2.16 mmol) were added to a solution of 4-hydroxybenzoic acid (40 mmol) in DMSO (100 cm$^3$) under N$_2$. The reaction mixture in the closed flask was stirred using magnetic stir bar a 75° C. for 24 h. The reaction mixture was transferred into water (500 cm$^3$) containing 15 cm$^3$ of concentrated HCl. Crude reaction product revealed the presence of an alkyloxybenzoic acid (III) and its alkyl ester. The organic phase (extracted in ether) was washed liberally in an excess of water. The ether layer was concentrated, and the residual reaction mixture was taken up in ethanol (95% v/v) (100 cm) and added NaOH (3.00 g, 75 mmol) and heated at 70° C. for 30 min. The mixture was treated with aqueous HCl (500 cm$^3$, 1 M). The solid product (III) was filtered and washed with water, dried and crystallized from cold pentane.

4-Octyloxybenzoic Acid (IIIa)

Yield 75.6%. Mp 92-95° C. (Found: C 71.8; H, 8.8. C$_{15}$H$_{22}$O$_3$ requires C, 71.97; H, 8.86%) $v_{max.}$ (KBr) 3502 (br), 2926, 2853, 1680, 1604, 1427, 1305, 1253, 1166, 1062, 948, 845, and 771 cm$^{-1}$. $\delta_H$ (CDCl$_3$) 0.89 (3H, t, J=7.0 Hz), 1.20-1.55 (10H, m), 1.80 (2H, quint, J=6.8 Hz), 4.02 (2H, t, J=6.7 Hz), 6.94 (2H, d, J=5.2 Hz,), 8.05 (2H, d, J=5.2 Hz). $\delta_C$ (CDCl$_3$): 14.08, 22.65, 25.98, 29.08, 29.21, 29.30, 31.79, 68.28, 114.18 (2 C), 121.38, 132.33 (2C), 163.70, 172.07.

4-Dodecyloxybenzoic Acid (IIIb)

Yield: 80.2% (ether). Mp 92-94° C. (Found: C, 74.5; H, 9.9. C$_{19}$H$_{30}$O$_3$ requires C, 74.47; H, 9.87%); $v_{max.}$ (KBr) 3448 (br), 2920, 2850, 1682, 1604, 1511, 1468, 1427, 1305, 1255, 1167, 946, 845 and 771 cm$^{-1}$. $\delta_H$ (CDCl$_3$) 0.88 (3H, t, J=7.0 Hz), 1.10-1.55 (18H, m), 1.81 (2H, quint, J=6.8 Hz), 4.02 (2H, t, J=6.8 Hz), 6.92 (2H, d, J=8.9 Hz), 8.05 (2H, d, J=8.9 Hz). $\delta_C$ (CDCl$_3$): 14.11, 22.69, 25.96, 29.08, 29.35 (2C), 29.57 (2C), 29.64 (2C), 31.91, 68.28, 114.17 (2C), 121.38, 132.33 (2C), 163.70, 172.17.

4-Octadecyloxybenzoic Acid (IIIc)

Yield: 81.3%. Mp 102-105° C. (Found: C, 76.7; H, 10.7. C$_{25}$H$_{42}$O$_3$ requires C, 76.87; H, 10.84%); $v_{max.}$ (KBr) 3448

(br), 2919, 2850, 1678, 1604, 1469, 1428, 1309, 1256, 1168, 941, 845, and 771 cm$^{-1}$; $\delta_H$ (CDCl$_3$) 0.88 (3H, t, J=7.0 Hz), 1.15-1.55 (30H, m), 1.81 (2H, quint, J=6.8 Hz), 4.02 (2H, t, J=6.8 Hz), 6.93 (2H, d, J=8.9 Hz,), 8.05 (2H, d, J=8.9 Hz). $\delta_C$ (CDCl$_3$): 14.11, 22.69, 25.96, 29.08, 29.36 (2C), 29.70 (10 C), 31.92, 68.29, 114.19 (2 C), 121.38, 132.33 (2 C), 164.10, 171.65.

General Procedure for the Synthesis of Alkoxybenzamides (IV)

A mixture of alkoxybenzoic acid (III) (55 mmol) in SOCl$_2$ (15 cm$^3$) was heated at 80° C. for 30 min. After removal of the excess SOCl$_2$, the residual liquid was added drop wise to a 30% NH$_3$ solution (150 cm$^3$) at 0° C. The benzamide (IV) was filtered and dried.

4-Octyloxybenzamide (IVa)

Yield: 93%. MP 152-153° C. (Found: C, 72.1; H, 9.2; N, 5.5. C$_{15}$H$_{23}$NO$_2$ requires C, 72.25; H, 9.30; N, 5.62%); $v_{max.}$ (KBr) 3397, 3172, 2922, 2851, 1650, 1610, 1572, 1515, 1468, 1421, 1393, 1305, 1253, 1177, 1145, 1120, 1026, 997, 853, 800, 759, 720, 644 and 620 cm$^{-1}$. $\delta_H$ (CDCl$_3$, 45° C.) 0.89 (3H, t, J 7.0 Hz), 1.30 (8H, m), 1.45 (2H, m), 1.79 (2H, m), 4.00 (2H, t, J 6.7 Hz) 5.80 (2H, br), 6.91 (2H, d, J 8.9 Hz), 7.76 (2H, d, J 8.9 Hz). $\delta_C$ (CDCl$_3$, 45° C.): 13.75, 22.36, 25.75, 28.91, 28.93, 29.05, 31.53, 68.07, 114.12 (2C), 125.23, 129.00 (2C), 162.05, 168.66.

4-Dodecyloxybenzamide (IVb)

Yield: 87%. Mp 143-145° C. (Found: C, 74.5; H, 10.0; N, 4.5. C$_{19}$H$_{31}$NO$_2$ requires C, 74.71; H, 10.23; N, 4.59%); $v_{max.}$ (KBr) 3387, 3179, 2921, 2851, 1647, 1611, 1572, 1516, 1469, 1421, 1395, 1308, 1256, 1175, 1145, 1120, 1019, 844, 799, 723, and 621 cm$^{-1}$; $\delta_H$ (CDCl$_3$, 45° C.) 0.88 (3H, t, J 7.0 Hz), 1.30 (16H, m), 1.45 (2H, m), 1.79 (2H, m), 4.00 (2H, t, J 6.7 Hz), 5.80 (2H, br), 6.91 (2H, d, J 8.9 Hz), 7.76 (2H, d, J 8.9 Hz). $\delta_C$ (CDCl$_3$, 45° C.): 14.13, 22.69, 25.98, 29.12, 29.37 (2C), 29.56, 29.59, 29.64, 29.65, 31.92, 68.23, 114.27 (2C), 125.23, 129.25 (2C), 162.23, 168.93.

4-Octadecyloxybenzamide (IVc)

Yield: 95%. Mp 138-139° C. (Found: C, 76.8; H, 10.9; N, 3.5, C$_{25}$H$_{43}$NO$_2$ requires C, 77.07; H, 11.12; N, 3.59%); $v_{max.}$ (KBr) 3426, 3195, 2919, 2849, 1649, 1616, 1577, 1515, 1471, 1424, 1397, 1307, 1252, 1180, 1145, 1120, 1035, 845, 781, and 719 cm$^{-1}$; $\delta_H$ (CDCl$_3$, 45° C.) 0.88 (3H, t, J 7.0 Hz), 1.27 (28H, m), 1.45 (2H, m), 1.79 (2H, m), 4.00 (2H, t, J 6.7 Hz), 5.70 (2H, br), 6.91 (2H, d, J 8.9 Hz), 7.75 (2H, d, J 8.9 Hz). $\delta_C$ (CDCl$_3$, 45° C.): 14.04, 22.66, 26.01, 29.17, 29.35 (3C), 29.68 (9C), 31.92, 68.33, 114.39 (2C), 125.23, 129.26 (2C), 162.50, 168.79.

General Procedure for the Synthesis of Alkoxybenzonitriles (V)

A mixture of alkoxybenzamide IV (45 mmol) in SOCl$_2$ (70 mmol) in benzene (20 cm$^3$) was heated at 80° C. for 1 h or until the reaction was complete as indicated by TLC experiment (silica, Et$_2$O/MeOH 9:1). After removal of the excess SOCl$_2$, the residual liquid was crystallized from pentane to give the benzonitrile (V).

4-Octyloxybenzonitrile (Va)

Yield: 86%. Mp 32-34° C. (Found: C, 77.6; H, 9.1; N, 5.9. C$_{15}$H$_{21}$NO requires C, 77.88; H, 9.15; N, 6.05%); $v_{max.}$ (KBr) 2927, 2857, 2224, 1605, 1573, 1508, 1468, 1391, 1301, 1259, 1171, 1114, 1020, 836, and 706 cm$^{-1}$; $\delta_H$ (CDCl$_3$) 0.88 (3H, t, J 7.0 Hz), 1.30 (8H, m), 1.44 (2H, m), 1.78 (2H, m), 3.99 (2H, t, J 6.7 Hz), 6.92 (2H, d, J 8.9 Hz), 7.56 (2H, d, J 8.9 Hz). $\delta_C$ (CDCl$_3$): 14.01, 25.85, 28.90, 29.11, 29.19, 31.70, 68.34, 103.53, 115.10 (2C), 119.24, 133.85 (2C), 162.39.

4-Dodecyloxybenzonitrile (Vb)

Yield: 87%. Mp 49-50° C. (Found: C, 79.1; H, 9.9; N, 4.8. C$_{19}$H$_{29}$NO requires C, 79.39; H, 10.17; N, 4.87%); $v_{max.}$ (KBr) 2916, 2848, 2217, 1607, 1573, 1508, 1472, 1397, 1302, 1257, 1170, 1115, 1029, 1002, 832, 813, and 716 cm$^{-1}$; $\delta_H$ (CDCl$_3$) 0.88 (3H, t, J 7.0 Hz), 1.31 (16H, m), 1.44 (2H, m), 1.80 (2H, m), 3.99 (2H, t, J 6.7 Hz), 6.92 (2H, d, J 8.9 Hz), 7.56 (2H, d, J 8.9 Hz). $\delta_C$ (CDCl$_3$): 14.13, 22.69, 25.93, 28.97, 29.32, 29.35, 29.54, 29.57, 29.65 (2C), 31.92, 68.42, 103.61, 115.17 (2C), 119.36, 133.95 (2C), 162.46.

4-Octadecyloxybenzonitrile (Vc)

Yield: 93%. Mp 69-70° C. (Found: C; 80.6; H, 10.9; N, 3.7. C$_{25}$H$_{41}$NO requires C, 80.80; H, 11.12; N, 3.77%); $v_{max.}$ (KBr) 2917, 2848, 2217, 1607, 1573, 1508, 1472, 1398, 1302, 1258, 1170, 1115, 1035, 833, 812, and 718 cm$^{-1}$; $\delta_H$ (CDCl$_3$), 0.88 (3H, t, J 7.0 Hz), 1.28 (28H, m), 1.44 (2H, m), 1.80 (2H, m), 3.99 (2H, t, J 6.7 Hz), 6.92 (2H, d, J 8.9 Hz), 7.56 (2H, d, J 8.9 Hz). $\delta_C$ (CDCl$_3$): 14.07, 22.64, 25.87, 28.92, 29.27, 29.32, 29.48, 29.52, 29.65 (8C), 31.87, 68.35, 103.54, 115.09 (2C), 119.25, 133.86 (2C), 162.39.

General Procedure for the Synthesis of 1-(2-aminoethyl)-2-alkoxyphenyl)-2-imidazolines (VIII)

A solution of alkoxybenzonitrile (V) (25 mmol) and diethylenetriamine (VI) (DETA) (62 mmol) containing cysteine-HCl (100 mg) was heated at 145° C. for 1 h. Thereafter, another portion of cysteine-HCl (100 mg) was added and the reaction mixture was heated at 145° C. for an additional 1 h. Evolution of NH$_3$ gas was observed which bubbled through the connected U-tube containing mineral oil. $^1$H NMR indicated the completion of the reaction. The reaction mixture was cooled and taken up in CH$_2$Cl$_2$ (50 cm$^3$). The unreacted DETA was removed from the organic layer by washing with water (3×300 cm$^3$); very careful agitation was required to avoid emulsion formation. Concentration of the dried (Na$_2$SO$_4$) organic layer afforded the imidazolines (VIII) as a pinkish liquid/semisolid. The imidazolines were pure as indicated by NMR spectra and used as such for the corrosion inhibition efficiency tests. The newly synthesized imidazolines gave satisfactory elemental analyses given the fact these compounds cannot be further purified by crystallization.

1-(2-Aminoethyl)-2-(4-octyloxyphenyl)-2-imidazoline (VIIIa)

Yield: 70%. $v_{max.}$ (neat) 3278, 2926, 2856, 1609, 1512, 1468, 1391, 1328, 1296, 1249, 1175, 1085, 1026, 950, and 839 cm$^{-1}$; $\delta_H$ (CDCl$_3$): 0.88 (3H, t, J 6.7 Hz), 1.20-1.50 (12H, m), 1.77 (2H, m), 2.86 (2H, t, J 6.4 Hz), 3.12 (2H, t, J 6.4 Hz), 3.43 (2H, t, J 9.5 Hz), 3.90 (2H, t, J 9.5 Hz), 3.97 (2H, t, J 6.4 Hz), 6.90 (2H, d, J 8.9 Hz), 7.50 (2H, d, J 8.9 Hz). $\delta_C$ (CDCl$_3$): 13.73, 22.28, 25.65, 28.84 (2C), 28.97, 31.43, 40.68, 51.10, 52.50, 52.88, 67.69, 113.92 (2C), 123.04, 129.33, (2C), 159.96, 167.52.

1-(2-Aminoethyl)-2-(4-dodecyloxyphenyl)-2-imidazoline (VIIIb)

Yield: 83%. $\nu_{max.}$ (neat) 3248, 2922, 2852, 1646, 1612, 1513, 1467, 1418, 1392, 1329, 1297, 1249, 1174, 1085, 1051, 1012, 950, 839, and 723 cm$^{-1}$; $\delta_H$ (CDCl$_3$): 0.88 (3H, t, J 6.7 Hz), 1.20-1.50 (20H, m), 1.77 (2H, m), 2.85 (2H, t, J 6.4 Hz), 3.11 (2H, t, J 6.4 Hz), 3.43 (2H, t, J 9.7 Hz), 3.88 (2H, t, J 9.8 Hz), 3.96 (2H, t, J 6.4 Hz), 6.88 (2H, d, J 8.7 Hz), 7.49 (2H, J 8.7 Hz); $\delta_C$ (CDCl$_3$): 13.96, 22.51, 25.85, 29.00, 29.18, 29.22, 29.42, 29.46 (2C), 29.48, 31.73, 40.87, 51.28, 52.69, 53.08, 67.85, 114.08 (2C), 123.21, 129.41 (2C), 160.13, 167.71.

1-(2-Aminoethyl)-2-(4-octadecyloxyphenyl)-2-imidazoline (VIIIc)

Yield: 95%. $\nu_{max.}$ (KBr) 3387, 2917, 2849, 1612, 1513, 1468, 1418, 1394, 1329, 1297, 1250, 1175, 1036, 837, and 721 cm$^{-1}$; $\delta_H$ (CDCl$_3$): 0.88 (3H, t, J 6.7 Hz), 1.20-1.50 (32H, m), 1.78 (2H, m), 2.85 (2H, t, J 6.1 Hz), 3.12 (2H, t, J 6.1 Hz), 3.44 (2H, t, J 9.8 Hz), 3.88 (2H, t, J 9.8 Hz), 3.96 (2H, t, J 6.4 Hz), 6.88 (2H, d, J 8.7 Hz), 7.49 (2H, J 8.7 Hz). $\delta_C$ (CDCl$_3$): 13.97, 22.53, 25.87, 29.04, 29.16, 29.21, 29.24, 29.37, 29.42, 29.45, 29.51 (2C), 29.55 (4C), 31.77, 40.86, 51.27, 52.65, 52.97, 67.88, 114.11 (2C), 123.14, 129.55 (2C), 160.19, 167.71.

General Procedure for the Synthesis of 1-[2-{2-(2-Aminoethylamino)-ethylamino}ethyl]-2-alkoxyphenyl-2-imidazolines (IX)

A solution of mono-alkoxybenzonitriles (V) (25 mmol) and tetraethylenepentamine (VII) (TEPA) (62 mmol) containing cysteine-HCl (100 mg) was heated a 145° C. for 1 h. Thereafter, another portion of cysteine-HCl (100 mg) was added and the reaction mixture was heated at 145° C. for an additional 1 h. Evolution of NH$_3$ gas was observed which bubbled through the connected U-tube containing mineral oil. $^1$H NMR indicated the completion of the reaction. The reaction mixture was cooled and taken up in CH$_2$Cl$_2$ (50 cm$^3$). An equivalent workup as described under the prior general procedure for the synthesis of 1-(2-aminoethyl)-2-alkoxyphenyl)-2-imidazolines afforded the imidazolines (IX) as a pinkish liquid/semisolid. The imidazolines were pure enough as indicated by NMR spectra and used as such for the corrosion tests.

1-[2-{2-(2-Aminoethylamino)ethylamino}ethyl]-2-(4-octyloxyphenyl)-2-imidazoline (IXa)

Yield: 78%. $\nu_{max.}$ (neat) 3286, 2924, 2853, 1612, 1514, 1467, 1420, 1393, 1331, 1296, 1249, 1174, 1114, 1026, 950, 838, and 740 cm$^{-1}$; $\delta_H$ (CDCl$_3$): 0.89 (3H, t, J 6.7 Hz), 1.20-1.65 (14H, m), 1.77 (2H, m), 2.67 (2H, t, J 5.8 Hz), 2.73 (4H, s), 2.77 (2H, t, J 6.7 Hz), 2.80 (2H, t, J 6.0 Hz), 3.19 (2H, t, J 6.4 Hz), 3.42 (2H, t, J 9.7 Hz), 3.88 (2H, t, J 9.7 Hz), 3.96 (2H, t, J 6.4 Hz), 6.89 (2H, d, J 8.9 Hz), 7.50 (2H, J 8.9 Hz). $\delta_C$ (CDCl$_3$): 14.11, 22.64, 26.00, 29.17, 29.21, 29.33, 31.78, 41.81, 48.54, 49.25, 49.57, 49.99, 51.55, 52.51, 53.19, 68.03, 114.24 (2C), 123.37, 129.67 (2C), 160.29, 167.77.

1-[2-{2-(2-Aminoethylamino)ethylamino}ethyl]-2-(4-dodecyloxyphenyl)-2-imidazoline (IXb)

Yield: 77%. $\nu_{max.}$ (neat) 3282, 2924, 2853, 1613, 1514, 1466, 1420, 1390, 1330, 1296, 1249, 1173, 1115, 1069, 1011, 949, 838, and 735 cm$^{-1}$; $\delta_H$ (CDCl$_3$): 0.88 (3H, t, J 6.7 Hz), 1.20-1.70 (22H, m), 1.78 (2H, m), 2.67 (2H, t, J 5.8 Hz), 2.73 (4H, s), 2.78 (2H, t, J 6.6 Hz), 2.81 (2H, t, J 6.1 Hz), 3.19 (2H, t, J 6.4 Hz), 3.44 (2H, t, J 9.7 Hz), 3.88 (2H, t, J 9.7 Hz), 3.96 (2H, t, J 6.4 Hz), 6.89 (2H, d, J 8.9 Hz), 7.50 (2H, J 8.9 Hz). $\delta_C$ (CDCl$_3$): 14.13, 22.68, 26.02, 29.18, 29.35, 29.38, 29.60 (2C), 29.63 (2C), 31.92, 41.83, 48.56, 49.26, 49.58, 50.00, 51.57, 52.55, 53.24, 68.04, 114.25 (2C), 123.30, 129.67 (2C), 160.14, 167.78.

1-[2-{2-(2-Aminoethylamino)ethylamino}ethyl]-2-(4-octadecyloxyphenyl)-2-imidazoline (IXc)

Yield: 93%. $\nu_{max.}$ (neat) 3480, 2914, 2847, 1599, 1513, 1466, 1420, 1387, 1331, 1248, 1174, 1115, 837, and 722 cm$^{-1}$. $\delta_H$ (CDCl$_3$): 0.88 (3H, t, J 6.7 Hz), 1.20-1.60 (34H, m), 1.78 (2H, m), 2.68 (2H, t, J 5.5 Hz), 2.73 (4H, s), 2.78 (2H, t, J 6.5 Hz), 2.81 (2H, t, J 5.8 Hz), 3.19 (2H, t, J 6.4 Hz), 3.43 (2H, t, J 9.7 Hz), 3.88 (2H, t, J 9.7 Hz), 3.96 (2H, t, J 6.4 Hz), 6.89 (2H, d, J 8.9 Hz), 7.50 (2H, J 8.9 Hz). $\delta_C$ (CDCl$_3$): 14.14, 22.69, 26.03, 29.20, 29.37, 29.41, 29.60, 29.63, 29.70 (8C), 31.93, 41.86, 48.59, 49.29, 49.62, 50.04, 51.60, 52.58, 53.28, 68.04, 114.25 (2C), 123.42, 129.68 (2C), 160.30, 167.80.

Specimens

For the electrochemical tests, corrosion studies were carried out with mild steel coupons of the following composition: 0.089% (C), 0.037 (Cr), 0.34% (Mn), 0.022 (Ni), 0.010 (P), 0.007 (Mo), 0.005 (V), 0.005 (Cu), 99.47% (Fe). A 1 mm thick mild steel sheet was machined to a flag shape with a stem approximately 3 cm in length. Insulating the stem by araldite (affixing material) provided 2 cm$^2$ exposed area which was abraded with increasing grades of emery papers (100, 400, 600 and 1500 grit size), washed with distilled deionized water and acetone prior to drying in an oven at 110° C. The dried specimens were stored in a desiccator until being used. Immediately before use, the electrode specimens were placed in an ultrasonic bath for 5 minutes acid then washed with distilled water.

For autoclave tests, the two types of mild steel coupons A and B measuring ≈2.5×2.0×0.1 cm$^3$ have the following composition:

Coupon A:
0.082% (C), 0.016% (Cr), 0.207% (Mn), 0.062% (Ni), 0.029% (Cu), 0.012% (Mo), <0.001% (V), 0.032% (Si), <0.0005% (P), 0.0059% (S), 0.011% (Co), 0.045% (Al), <0.0010 (Nb), <0.0005% (Ti), <99.3% (Fe).

Coupon B:
0.168% (C), 0.038% (Cr), 0.495% (Mn), 0.034% (Ni), 0.074% (Cu), 0.0081% (Mo), 0.001% (V), 0.237% (Si), 0.014% (P), 0.024% (S), 0.011% (Co), 0.080% (Al), 0.0019 (Nb), 0.0015% (Ti), <98.6% (Fe).

Solutions

Corrosion inhibition tests have been performed in 0.5 M NaCl in the presence of CO$_2$ (1 atm) at 40° C. as well as at higher pressure (10 bar) of CO$_2$ and temperature of 120° C. De-aeration of the solution was achieved by purging with 99.999% N$_2$ (30 min) and then the solution was saturated by continuously bubbling with 99.999% pure CO$_2$. During polarization measurements, instead of bubbling, the gentle flow of CO₂ was maintained above the surface of the solution without agitating the bulk of the solution. The corrosion caused by oxygen is avoided by the use of the high purity $CO_2$. In an aqueous solution of $CO_2$, at pH<4 the corrosion usually occurs by reaction with $H^+$, while above pH 4 the active species is adsorbed $CO_2$ or $H_2CO_3$ [S. Nesic, K. L. J. Lee, A mechanistic model for carbon dioxide corrosion of mild steel in the presence of protective iron carbonate films-part 3: film growth model, Corrosion, 59 (2003) 616-627. Incorporated herein in its entirety]. In order to avoid any change in the corrosion mechanism, a solution of $NaHCO_3$ (100 mg/L) was used to maintain the pH between 5.0 and 5.5.

Electrochemical Measurements

Tafel Extrapolations

The polarization studies were carried out in a 250 cm³ of 0.5 M NaCl solution at 40° C. in the presence of $CO_2$ (1 atm), and furthermore, in both the absence and presence of inhibitors at various concentration thereof. The electrochemical cell, assembled in a 750 cm³ round-bottom flask, consisted of a saturated calomel electrode (SCE) as a reference electrode, a mild steel working electrode, and a graphite electrode (≈5 mm diameter) as a counter electrode. The bubbler has one outlet and inlet for the $CO_2$. The polarization curves were recorded by a computer controlled potentiostat-galvanostat (Auto Lab, Booster 10A-BST707A, Eco Chemie, Netherlands). A computer (Windows 7) loaded with NOVA (Version 1.8) software processed the data. All three electrode cells were connected to the potentiostat (Auto Lab), and used for measurements. A stable open circuit potential was achieved after pre-corroding the working electrode in the solution; within a time frame of 30-60 min. A scan of ±250 mV with respect to the open circuit potential $E_{corr}$ is conducted at a rate of 0.5 mV/s.

Linear Polarization Resistance (LPR) Method

The cell described above was also used for the LPR measurement. The current potential plots (in a range of ±10 mV around $E_{corr}$) provided the polarization resistance values.

Gravimetric Measurements at High Temperature and Pressure: Autoclave Experiments The weight-loss measurements at a high temperature of 120° C. and a $CO_2$ pressure of 10 bar in 0.5 M NaCl solution (250 cm³) in the absence and presence of inhibitors (200 ppm) was carried out in a R&D Autoclave Bolted Closure System (Autoclave Engineers, Model #401C-0679) for 48 h. The detailed experimental procedure is described in our earlier work [M. A. J. Mazumder, H. A. Al-Muallem, M. Faiz, S. A. Ali, Design and synthesis of a novel class of inhibitors for mild steel corrosion in acidic and carbon dioxide-saturated saline media, Corros. Sci. (2014), DOI: 10.1016/j. Incorporated herein by reference in its entirety]. The carbon-steel coupons prepared as described (vide supra) were immersed into the test solution.

Measurement of Surface Tension

The surface tension of the imidazoline samples in 0.5 M NaCl solution at 40° C. were measured by PHYWE surface tensiometer (Germany) following the operating principle of the du Nouy ring method. The surface tensiometer equipped with a torsion dynamometer (0.01 N) and a platinum iridium ring with a diameter of 1.88 cm was used to measure the tear off force. Solutions of different concentrations were prepared from 0.5 M NaCl and equilibrated to 40° C. Solutions of $CO_2$ saturated 0.5 M NaCl was made by passing $CO_2$ gas at 40° C.

The standard free energy of micelle formation ($\Delta G°_{mic}$)

The $\Delta G°_{mic}$ of the synthesized imidazoline surfactant is given by Eq. (6):

$$\Delta G°_{mic} = RT \ln(C_{corr}/\text{mol } L^{-1}) \quad (6)$$

[H.-J. Butt, K. Graf, M. Kappl, Physics and Chemistry of Interfaces. Wiley-VCH, Weinheim, 2003 pp. 253 Incorporated herein in its entirety.] where R, T and $C_{corr}$ represent the gas constant, temperature and concentration of the surfactant at the critical micelle concentration (CMC).

X-Ray Photoelectron Spectroscopy

The metal coupons of dimension 2.5×2.0×0.1 cm³ as treated in the electrochemical tests in $CO_2$ saturated 0.5 M NaCl at 40° C. for 6 h were rinsed with distilled deionized water and dried under $N_2$. The XPS analysis using Advantage software for all data processing, was performed using a Thermos Scientific X-ray photoelectron spectrometer (Model #Escalab 250 Xi) and the samples were irradiated with monochromated Al $K_\alpha$ X-rays (1486.6 eV) of spot size of diameter 650 μm. The spectra were referenced with a C 1 s peak at 285.4 eV. XPS spectra were deconvoluted using non-linear least squares algorithm with a Shirley base line and a Gaussian-Lorentzian combination.

Synthesis of the Corrosion Inhibitors

Figure 3:
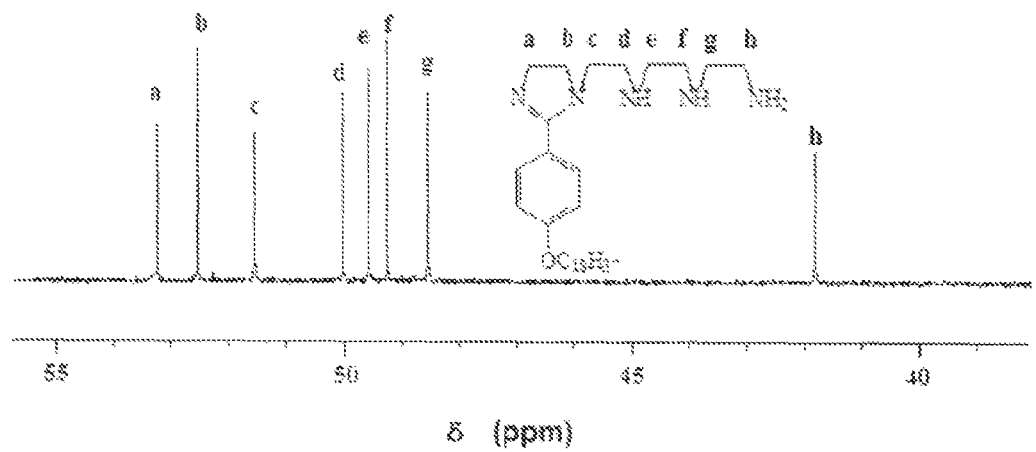
FIG. 3 shows a $^{13}C$ NMR spectra of the imidazoline (IXc) in the δ 40-55 ppm range in $CDCl_3$.
Figure 4:
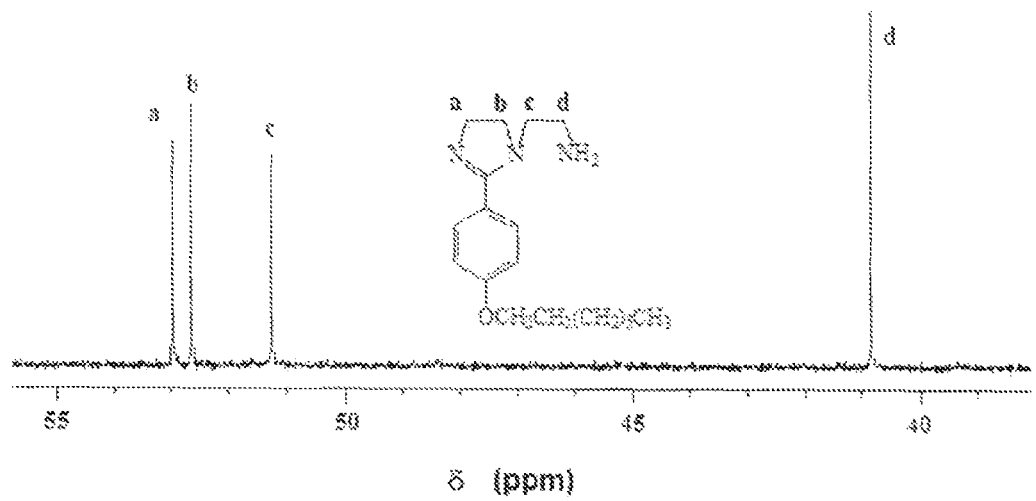
FIG. 4 shows a $^{13}C$ NMR spectra of the imidazolines (VIIIc) in the δ 40-55 ppm range in $CDCl_3$.
Figure 5A:
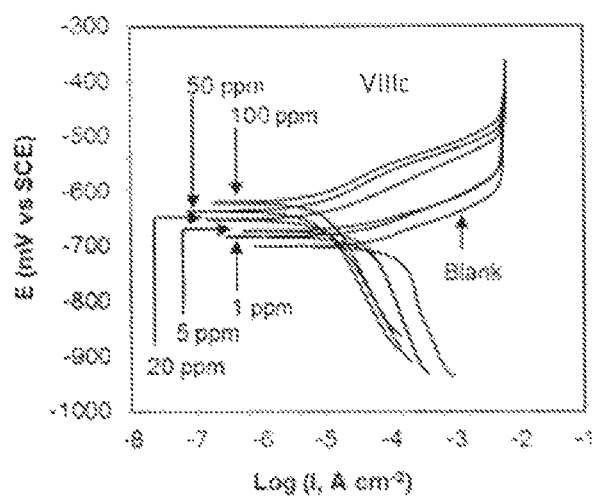
FIG. 5A shows a potentiodynamic polarization curve(s) at 40° C. for mild steel in $CO_2$ saturated 0.5 M NaCl containing various concentrations of VIIIc.
Figure 5B:
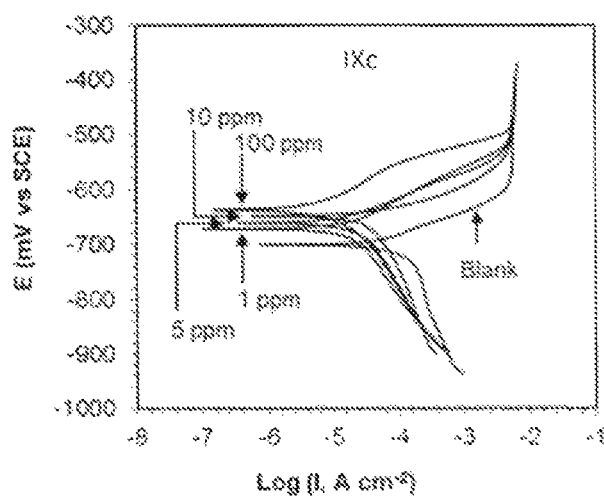
FIG. 5B shows a potentiodynamic polarization curve(s) at 40° C. for mild steel in $CO_2$ saturated 0.5 M NaCl containing various concentrations of IXc.
Figure 5C:
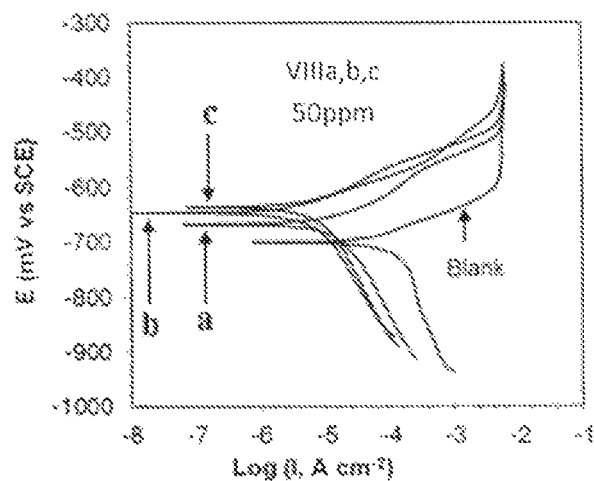
FIG. 5C shows a potentiodynamic polarization curve(s) at 40° C. for mild steel in $CO_2$ saturated 0.5 NaCl containing 50 ppm of VIII a, b, c
Figure 5D:
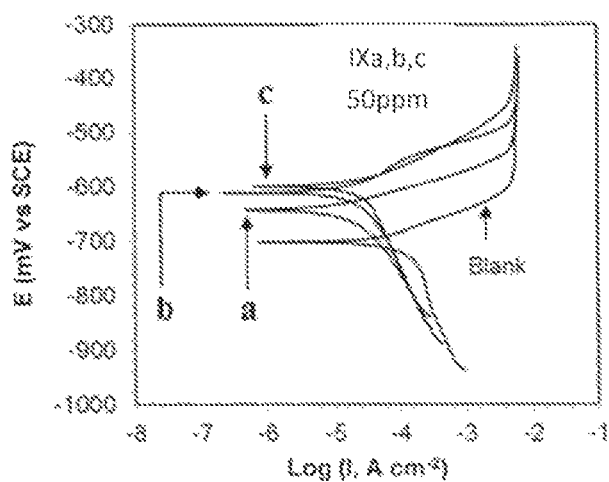
FIG. 5D shows a potentiodynamic polarization curve(s) at 40° C. for mild steel in $CO_2$ saturated 0.5 M NaCl containing 50 ppm of IX a,b,c.
Figure 6A:
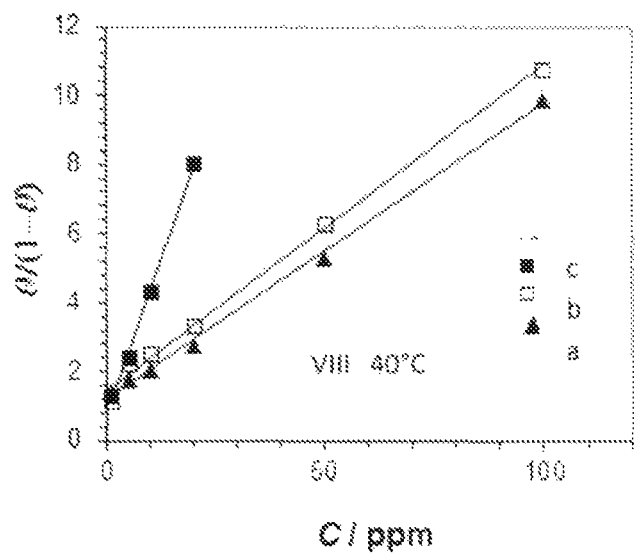
FIG. 6A shows a Langmuir adsorption isotherm of VIII a, b, c.
Figure 6B:
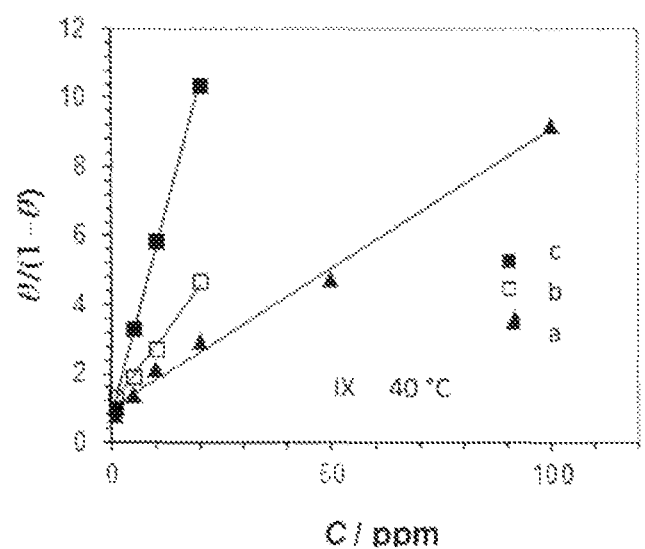
FIG. 6B shows a Langmuir adsorption isotherm of IX a, b, c at 40° C.
Figure 6C:
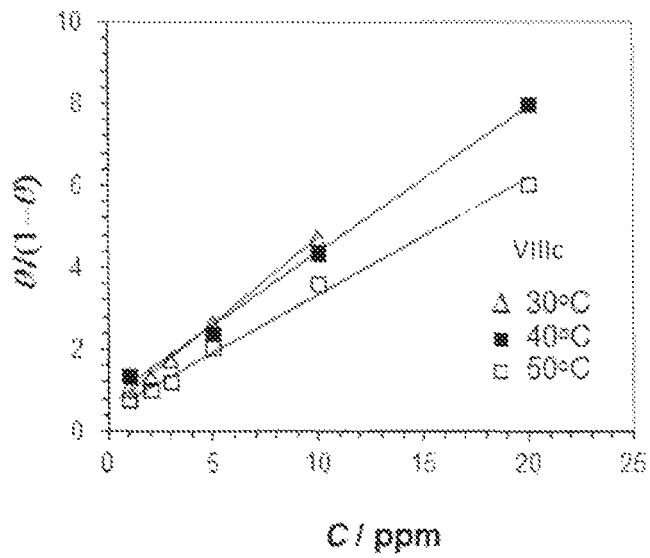
FIG. 6C shows a Langmuir adsorption isotherm of VIIIc and FIG. 6D shows a Langmuir adsorption isotherm of IXc at various temperatures in $CO_2$ saturated 0.5 NaCl solution.
Figure 6D:
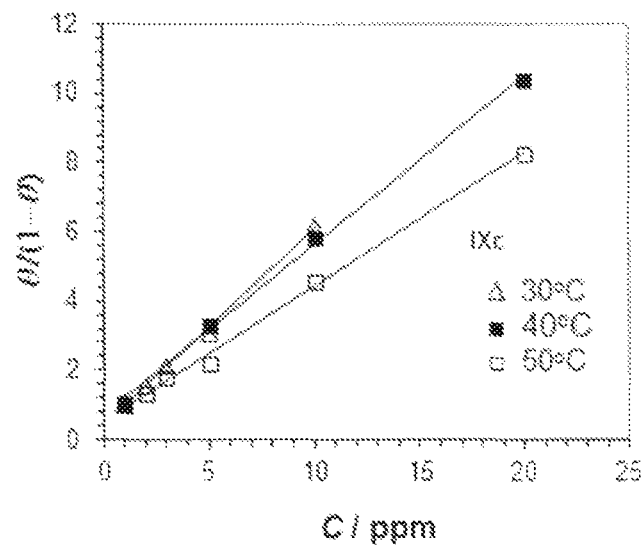

As outlined in Scheme 2, p-hydroxybenzoic acid was O-alkylated to give p-alkoxycarboxylic acid in excellent yields. A mixture of an equimolar amount of the acid and DETA was heated at temperatures ranging from 185-250° C. initially using a procedure as described in: Y. Wu, P. R. Herrington, Thermal reactions of fatty acids with diethylene triamine. J. Am. Oil Chem. Soc. 74 (1997) 61-64, and Y. Duda, R. G. Rueda, M. Galicia, H. I. Beltran, L. S. Z. Rivera, Corrosion inhibitors: Design, performance, and computer simulations J. Phys. Chem. B, 109 (2005) 22674-22684, which are incorporated herein by reference in their entirety, in order to generate the imidazolines (VIII). However, a complicated mixture of products that contained variable amounts of the unreacted acid and amide along with the desired imidazoline (VIII) (≈50%) was obtained. This mixture may as well serve as an effective inhibitor mixture. However, one objective was to synthesize and determine the inhibition efficiencies of the pure imidazolines alone. In order to pursue the synthesis of the proposed imidazolines, a different synthetic protocol was designed; the use of nitrile (CN) instead of an acid ($CO_2H$) group was envisaged. For this purpose, nitriles have been prepared in excellent yields as illustrated in Scheme 2. The reaction of the nitrile with DETA was carried out using the procedure as mentioned in U.S. Pat. No. 4,420,619, [A. Marxer, Imidazole urea and amido compounds. (1983), Incorporated herein by reference in its entirety.] However, the use of $CS_2$ as a catalyst failed to give the imidazoline (VIII) in the temperature range 110-145° C. A further modification of the catalyst to cysteine HCl, and maintaining a precise temperature range of 140° C. to 150° C., led to the formation of the imidazolines (VIII) and (IX) using DETA (VI) and TEPA (VII), respectively, with excellent yields. In a most preferred embodiment, the reaction temperature is maintained at 145° C. The imidazolines were readily identified by $^1H$ and $^{13}C$ NMR spectroscopy. The $^1H$ NMR spectra of the imidazolines VIIIa and IXa and a $^{13}C$ NMR spectra of VIIIc and IXc are shown in FIGS. 3 and 4, respectively. The carbon spectra revealed the presence of four and eight signals for the carbons marked as a-d and a-h in VIIIc and IXc, respectively.

Preparing a series of imidazolines, bearing different N-substituents and alkoxy chains, allows for the assessment and comparison of their inhibition effects. Two commercial inhibitor samples: QI80-E (R=$C_{12}$ to $C_{22}$) from Materials Performance and ARMOHIB 219 from AKZO NOBEL were also tested for the purpose of comparison and are shown below:

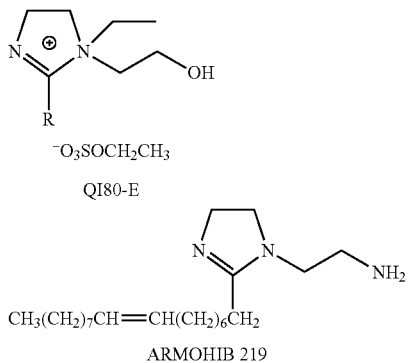

Electrochemical Measurements

Tafel Extrapolation

The corrosion inhibition results of inhibitors VIIIa-c and IXa-c, carried out in a $CO_2$-saturated 0.5 M NaCl solution using Tafel plot extrapolation, are summarized in Tables 1 and 2. The pH was kept in the range of 5.0-5.5 to minimize the direct reduction of $H_2CO_3$ (Eq. 1) [W. Durnie, R. De Marco, A. Jefferson, B. Kinsella, Development of a structure-activity relationship for oil field corrosion inhibitors, J. Electrochem. Soc. 146 (1999) 1751-1756. S. Nesic, G. T. Solvi, J. Enerhaug, Comparison of the rotating cylinder and pipe flow tests for flow-sensitive carbon dioxide corrosion, Corrosion 10 (1995) 51773-787. Incorporated herein by reference in their entirety]. Some representative Tafel plots are shown in FIGS. 5A, 5B, 5C, and 5D. Each pair of Tafel plots was analyzed [S. A. Ali, M. T. Saeed, S. U. Rahman, The isoxazolidines: a new class of corrosion inhibitors of mild steel in acidic medium, Corros. Sci. 45 (2003) 253-266. Incorporated herein by reference in its entirety.] in order to obtain the corrosion current density ($i_{corr}$) and the corrosion potential ($E_{corr}$). The extrapolation of cathodic Tafel lines with respect to free corrosion potential from Tafel plots was determined by using a computer (Windows 7) controlled potentiostat-galvanostat (AutoLab, Eco Chemie, Netherlands) instrument with the utilization of an automated linear curve fitting Nova 1.8 software.

LPR

The η% from a LPR technique was calculated using Eq. (7):

$$\eta(\%) = \left(\frac{R'_p - R_p}{R'_p}\right) \times 100 \qquad (7)$$

where $R_p$ and $R'_p$ are the respective polarization resistances in solution without or with the inhibitors in $CO_2$-saturated 0.5 M NaCl at 40° C. (Tables 3 and 4). Tables 3 and 4 also include inhibition data obtained at 30° C. and 50° C. The results of the Tafel extrapolation and LPR at 40° C. are compared in Table 5.

Adsorption Isotherms

Fractional inhibition efficiency η, equated to surface coverage θ of the electrode by an inhibitor molecule at its lower concentration range, is reported in Tables 1-4. Note that at higher inhibitor concentrations, the η versus θ relationship does not remain linear owing to a transition from a monolayer to a multilayer coverage. The θ values obtained by the LPR method (Tables 3 and 4) in $CO_2$-saturated 0.5 M NaCl, and C (the concentration in mol/L), were used to find the best among the following adsorption isotherms, namely:

Temkin: $K_{ads}C = e^{f\theta}$ (8)

Langmuir: $\theta/(1-\theta) = K_{ads}C$ (9)

Frumkin [37]: $K_{ads}C = \{\theta/(1-\theta)\}e^{-2\alpha\theta}$ (10)

Freundluich [38]: $\theta = K_{ads}C^\eta$ (11)

where $K_{ads}$ is the equilibrium constant of the adsorption process. The correlation coefficient revealed the best fit for the Langmuir isotherm for the inhibitors in $CO_2$ saturated 0.5 M NaCl in FIGS. 6A, 6B, 6C, and 6D, and it is also presented in Table 6. Some of the inhibitors demonstrated a good fit for both the Temkin, as well as Langmuir, adsorption isotherms. The molecular interaction parameter f, which describes molecular interactions in the adsorption layer as well as inhomogeneities on the surface of the electrode, was calculated from the Temkin isotherm (Table 6). [W. Durnie, R. De Marco, A. Jefferson, B. Kinsella, Development of a structure-activity relationship for oil field corrosion inhibitors, J. Electrochem. Soc. 146 (1999) 1751-1756. J. O'M. Bockris, S. U. M. Khan, Surface electrochemistry: A molecular level approach, Plenum press, New York and London, 1993, Incorporated herein by reference in their entirety.]

The $K_{ads}$ is related to the free energy of adsorption ($\Delta G°_{ads}$), by:

$$K_{ads} = \frac{1}{55.5}\exp\left(\frac{-\Delta G_{ads}}{RT}\right) \qquad (12)$$

Figure 7:
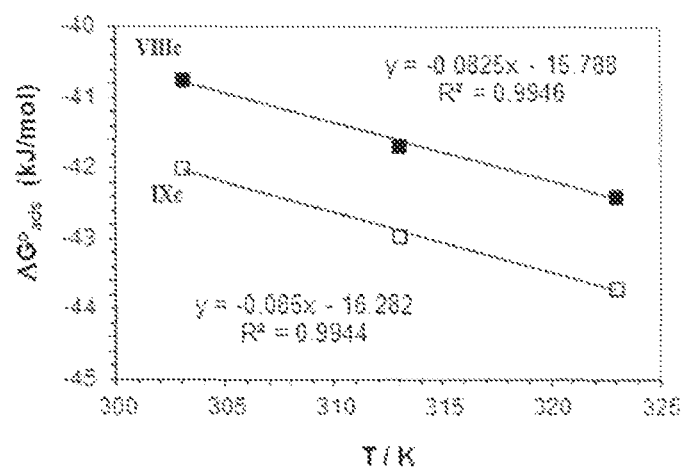
FIG. 7 shows a variation of $\Delta G°_{ads}$ versus T on mild steel in $CO_2$ saturated 0.5 M NaCl containing VIIIc and IXc.

The values of and $K_{ads}$ and $\Delta G°_{ads}$ are summarized in Table 7. The $\Delta S°_{ads}$ and $\Delta H°_{ads}$ for the adsorption process of the imidazolines VIIIc and IXc in the temperature range of 30-50° C. was obtained from a plot of $\Delta G°_{ads}$ versus T as shown in FIG. 7.

Gravimetric Measurements in $CO_2$-Saturated 0.5 M NaCl at High Temperature and Pressure The results of the experiments carried out at temperature of 120° C. and a pressure of 10 bar $CO_2$ in 0.5 M NaCl for 48 h are given in Table 8. Duplicate determinations were made in each case using coupons of almost identical masses. Percent inhibition efficiency (η%) was calculated using Eq. (13):

$$\eta \% = \frac{\text{Weight loss (blank)} - \text{Weight loss (inhibitor)}}{\text{Weight loss (blank)}} \times 100 \qquad (13)$$

Where the masses of the coupons differed, relative weight loss of the coupons were used to calculate η% [S. A. Ali, M. T. Saeed, S. U. Rahman, The isoxazolidines: a new class of corrosion inhibitors of mild steel in acidic medium, Corros. Sci. 45 (2003) 253-266.6, S. A. Ali, H. A. Al-Muallem, M. T. Saeed, S. U. Rahman, Hydrophobic-tailed bicycloisoxazolidines: A comparative study of the newly synthesized compounds on the inhibition of mild steel corrosion in hydrochloric and sulfuric acid media, Corros. Sci. 50 (2008)

664-675. Incorporated herein by reference in their entirety]. The average η%, as reported in Table 8, is found to have a standard deviation of 2-3%.

Surface Tension

Figure 8A:
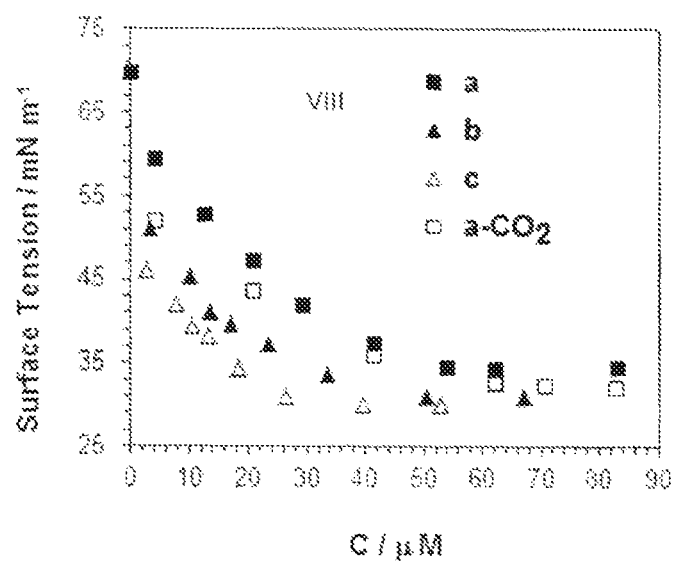
FIG. 8A shows a "Surface Tension versus Concentration" of imidazoline VIII a, b, c and VIIIa-$CO_2$.
Figure 8B:
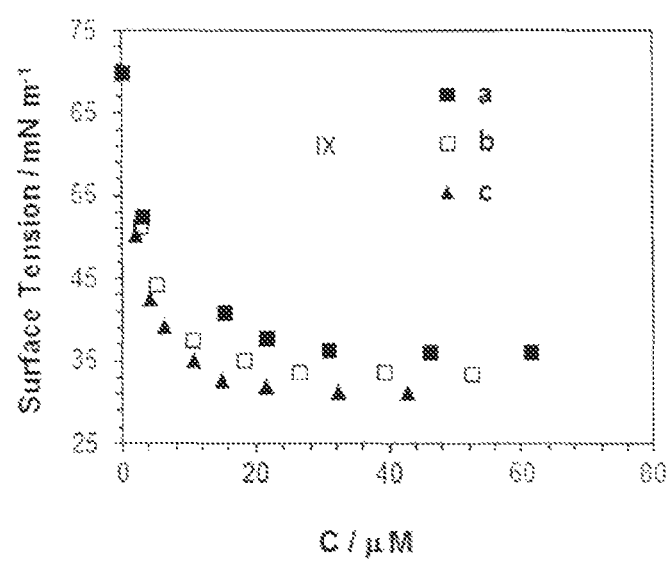
FIG. 8B shows a "Surface Tension versus Concentration" of imidazoline IX a,b,c in 0.5 M NaCl solution.
Figure 8C:
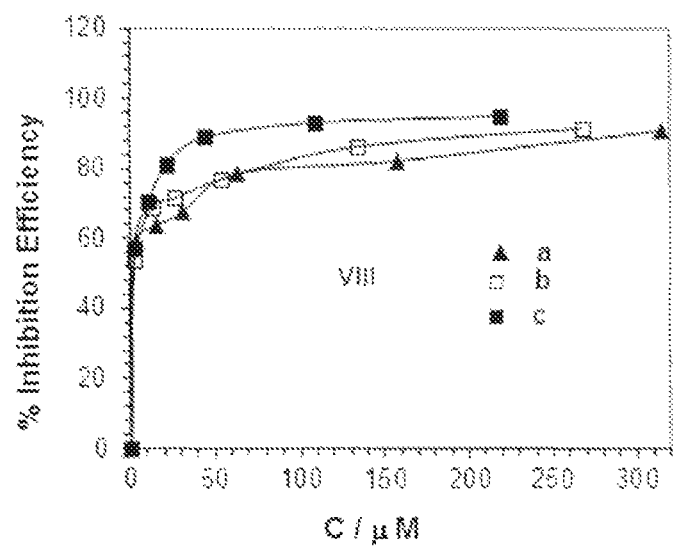
FIG. 8C shows inhibition efficiency versus concentration of imidazolines VIIIa,b,c in $CO_2$ saturated 0.5 M NaCl solution at 40° C.
Figure 8D:
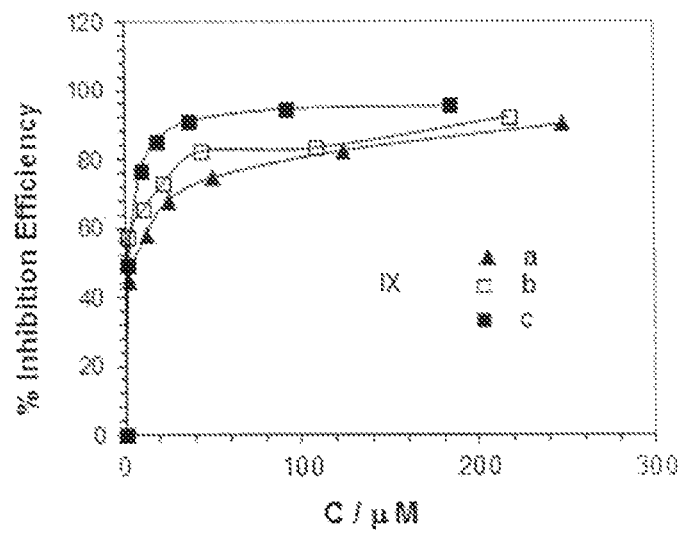
FIG. 8D shows inhibition efficiency versus concentration of imidazolines IX a,b,c in $CO_2$ saturated 0.5 M NaCl solution at 40° C.

The surface tension γ and critical CMC values for the imidazolines VIII and IX are measured in 0.5 M NaCl and 0.5 M NaCl+$CO_2$ at 40° C. and the results are given in Table 9. FIGS. 8A, 8B show the plot of surface tension γ against the concentration of the imidazolines under various conditions.

X-Ray Photoelectron Spectroscopy

The plots of the intensity (counts) versus binding energy (eV) as measured by XPS are shown in FIGS. 9A, 9B, 9C, 9D, 9E, 9F and 10A, 10B, 10C. The results of the surface analysis are given in Table 10.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A composition comprising an aminoalkyl imidazoline of formula (I)

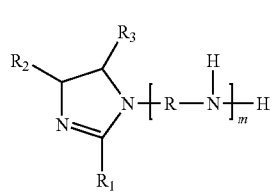

(I)

wherein m is an integer of 2 to 4;
R is a $C_2$ alkylene;
$R_1$ is an aromatic hydrocarbon of formula (II)

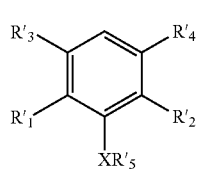

(II)

wherein X is oxygen;
$R'_1$ to $R'_4$ are each independently selected from the group consisting of hydrogen, $C_1$-$C_{30}$ alkyl, aminoalkyl, and aminoaryl;
$R'_5$ is a $C_5$-$C_{30}$ alkyl group; and
$R_2$ and $R_3$ and are each independently selected from the group consisting of hydrogen, hydroxyl, halogen, $C_1$-$C_{30}$ alkyl, alkenyl, aryl, alkylaryl, arylalkyl, aminoalkyl, aminoaryl, $(CH_2)_2COOH$, $CH_2CH(CH_3)COOH$, and imidazoline.

2. The composition of claim 1 wherein the aminoalkyl imidazoline comprises a 2-imidazoline ring substituted with an ethanamine group at a 5-N position of the 2-imidazoline ring, and a p-octyloxy phenyl group at a 1-C position of the 2-imidazoline ring.

3. The composition of claim 1 wherein the aminoalkyl imidazoline comprises a 2-imidazoline ring substituted with an ethanamine group at a 5-N position of the 2-imidazoline ring, and a p-dodecyloxy phenyl group at a 1-C position of the 2-imidazoline ring.

4. The composition of claim 1 wherein the aminoalkyl imidazoline comprises a 2-imidazoline ring substituted with an ethanamine group at a 5-N position of the 2-imidazoline ring, and a p-octadecyloxy phenyl group at the 1-C position of the 2-imidazoline ring.

5. The composition of claim 1 wherein the aminoalkyl imidazoline comprises a 2-imidazoline ring substituted with a $N^1$-(2-aminoethyl)-$N^2$-ethylethane-1,2-diamine group at a 5-N position of the 2-imidazoline ring, and a p-octyloxy phenyl group at a 1-C position of the 2-imidazoline ring.

6. The composition of claim 1 wherein the aminoalkyl imidazoline comprises a 2-imidazoline ring substituted with a $N^1$-(2-aminoethyl)-$N^2$-ethylethane-1,2-diamine group at a 5-N position of the 2-imidazoline ring, and a p-dodecyloxy phenyl group at a 1-C position of the 2-imidazoline ring.

7. The composition of claim 1 wherein the aminoalkyl imidazoline comprises a 2-imidazoline ring substituted with a $N^1$-(2-aminoethyl)-$N^2$-ethylethane-1,2-diamine group at a 5-N position of the 2-imidazoline ring, and a p-octadecyloxy phenyl group at the 1-C position.

8. The composition of claim 1 further comprising one or more additives selected from the group consisting of surfactants, intensifiers, solvents, oil-wetting components, dispersants, scale inhibitors and biocides.

9. A method of inhibiting a metal corrosive process of a mild steel surface in contact with a process stream comprising at least one constituent selected from the group consisting of water, petroleum, and petroleum products, the method comprising:

contacting the mild steel surface with the composition of claim 1 by
  spraying the mild steel surface with the composition,
  dipping the mild steel surface into the composition, and/or
  adding the composition to said process stream and contacting said mild steel surface with the process stream.

10. A method of preventing or reducing corrosion, comprising:

adding to a process stream an effective corrosion inhibiting amount of one or more aminoalkyl imidazolines of formula (I)

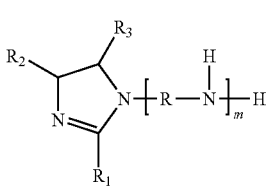

(I)

wherein m is an integer of 2 to 4;
R is a $C_2$ alkylene;

$R_1$ is an aromatic hydrocarbon of formula (II)

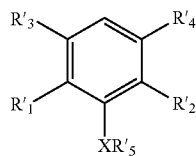

(II)

wherein X is oxygen;
$R'_1$ to $R'_4$ are each independently selected from the group consisting of hydrogen $C_1$-$C_3$ alkyl, aminoalkyl, and aminoaryl;
$R'_5$ is a $C_5$-$C_{30}$ alkyl group; and
$R_2$ and $R_3$ and are each independently selected from the group consisting of hydrogen, hydroxyl, halogen, $C_1$-$C_{30}$ alkyl, alkenyl, aryl, alkylaryl, arylalkyl, aminoalkyl, aminoaryl, $(CH_2)_2COOH$, $CH_2CH(CH_3)COOH$, and imidazoline.

11. The method of claim 10 wherein the process stream comprises at least one constituent selected from the group consisting of water, petroleum, and petroleum products, and at least one constituent selected from the group consisting of carbon dioxide ($CO_2$), hydrogen sulfide ($H_2S$), and NaCl.

12. The method of claim 10 wherein said effective corrosion inhibiting amount is 0.1 to 1,000 ppm by weight of 1 the aminoalkyl imidazoline.

13. The method of claim 10 wherein said effective corrosion inhibiting amount is 1.0 to 500 ppm by weight of the aminoalkyl imidazoline.

14. The method of claim 10 wherein said adding of the aminoalkyl imidazolines is continuous or intermittent.

* * * * *